(12) United States Patent
Zhang

(10) Patent No.: US 10,274,578 B2
(45) Date of Patent: Apr. 30, 2019

(54) TERMINAL DEVICE POSITIONING METHOD AND SYSTEM, AND APPARATUS

(71) Applicant: Huawei Technologies Co., Ltd., Shenzhen (CN)

(72) Inventor: Yi Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/463,370

(22) Filed: Mar. 20, 2017

(65) Prior Publication Data

US 2017/0192082 A1 Jul. 6, 2017

Related U.S. Application Data

(63) Continuation of application No. PCT/CN2015/078589, filed on May 8, 2015.

(30) Foreign Application Priority Data

Sep. 18, 2014 (CN) .......................... 2014 1 0478353

(51) Int. Cl.
*H04W 24/00* (2009.01)
*G01S 5/02* (2010.01)
(Continued)

(52) U.S. Cl.
CPC .............. *G01S 5/0268* (2013.01); *G01S 1/02* (2013.01); *G01S 5/0221* (2013.01);
(Continued)

(58) Field of Classification Search
CPC ... H04W 4/22; H04W 76/007; H04W 84/022; H04W 88/06
(Continued)

(56) References Cited

U.S. PATENT DOCUMENTS

2004/0258100 A1 12/2004 Jantti et al.
2005/0153712 A1 7/2005 Osaka et al.
(Continued)

FOREIGN PATENT DOCUMENTS

CN  1731893 A  2/2006
CN  1844948 A  10/2006
(Continued)

OTHER PUBLICATIONS

Machine Translation and Abstract of Chinese Publication No. CN1731893, Feb. 8, 2006, 15 pages.
(Continued)

*Primary Examiner* — Joseph Arevalo
(74) *Attorney, Agent, or Firm* — Conley Rose, P.C.

(57) ABSTRACT

A terminal device positioning apparatus, includes a receiver configured to receive at least one second signal, or receive a first signal and at least one second signal, where the first signal is sent by a terminal device to an antenna terminal, and the at least one second signal is generated after each antenna terminal in at least one antenna terminal performs delay processing or frequency conversion processing on the first signal, and a processor configured to obtain location information of the terminal device by means of calculation according to the at least one second signal or according to the first signal and the at least one second signal. Delay processing or frequency conversion processing is performed on the first signal of the terminal device, and calculation is performed.

17 Claims, 10 Drawing Sheets

(51) Int. Cl.
*G01S 1/02* (2010.01)
*H04B 17/318* (2015.01)
*H04W 64/00* (2009.01)
*H04W 88/02* (2009.01)
*H04W 88/08* (2009.01)

(52) U.S. Cl.
CPC .......... *G01S 5/0252* (2013.01); *H04B 17/318* (2015.01); *H04W 64/00* (2013.01); *H04W 88/02* (2013.01); *H04W 88/08* (2013.01)

(58) Field of Classification Search
USPC ........ 455/452.1, 461, 509, 404.1, 552.1, 21, 455/63.3, 188.1, 150.1, 75, 138, 334, 522, 455/42, 422, 419, 517, 441, 456.1, 435.1, 455/445, 450, 550
See application file for complete search history.

(56) References Cited

U.S. PATENT DOCUMENTS

| | | | | |
|---|---|---|---|---|
| 2014/0340255 | A1* | 11/2014 | Meerkerk | G01S 5/10 342/357.39 |
| 2017/0171842 | A1* | 6/2017 | You | H04L 5/0048 |

FOREIGN PATENT DOCUMENTS

| | | | |
|---|---|---|---|
| CN | 102057294 | A | 5/2011 |
| CN | 104053129 | A | 9/2014 |
| EP | 1448008 | A1 | 8/2004 |
| JP | S57152242 | A | 9/1982 |
| JP | H063428 | U | 1/1994 |
| JP | 2005028319 | A | 2/2005 |
| JP | 2005283195 | A | 10/2005 |
| KR | 101239166 | B1 | 3/2013 |

OTHER PUBLICATIONS

Machine Translation and Abstract of Chinese Publication No. CN1844948, Oct. 11, 2006, 11 pages.
Machine Translation and Abstract of Chinese Publication No. CN102057294, May 11, 2011, 3 pages.
Machine Translation and Abstract of Chinese Publication No. CN104053129, Sep. 17, 2014, 17 pages.
Foreign Communication From a Counterpart Application, PCT Application No. PCT/CN2015/078589, English Translation of International Search Report dated Aug. 4, 2015, 2 pages.
Foreign Communication From a Counterpart Application, PCT Application No. PCT/CN2015/078589, English Translation of Written Opinion dated Aug. 4, 2015, 5 pages.
Foreign Communication From a Counterpart Application, European Application No. 15842096.8, Extended European Search Report dated Jul. 26, 2017, 10 pages.
Machine Translation and Abstract of Japanese Publication No. JP2005028319, Feb. 3, 2005, 8 pages.
Machine Translation and Abstract of Japanese Publication No. JPH063428U, Jan. 18, 1994, 13 pages.
Machine Translation and Abstract of Japanese Publication No. JPS57152242, Sep. 20, 1982, 2 pages.
Foreign Communication From a Counterpart Application, Japanese Application No. 2017-515208, Japanese Office Action dated Apr. 3, 2018, 6 pages.
Foreign Communication From a Counterpart Application, Japanese Application No. 2017-515208, English Translation of Japanese Office Action dated Apr. 3, 2018, 6 pages.
Machine Translation and Abstract of Japanese Publication No. JP2005283195, Oct. 13, 2005, 47 pages.
Foreign Communication From a Counterpart Application, Japanese Application No. 2017-515208, Japanese Office Action dated Oct. 16, 2018, 2 pages.
Foreign Communication From a Counterpart Application, Japanese Application No. 2017-515208, English Translation of Japanese Office Action dated Oct. 16, 2018, 3 pages.
Machine Translation and Abstract of Korean Publication No. KR101239166, Mar. 5, 2013, 20 pages.
Foreign Communication From a Counterpart Application, Korean Application No. Oct. 2017-7009590, Korean Office Action dated Jan. 31, 2019, 4 pages.
Foreign Communication From a Counterpart Application, Korean Application No. 10-2017-7009590, English Translation of Korean Office Action dated Jan. 31, 2019, 2 pages.

* cited by examiner

TERMINAL DEVICE POSITIONING METHOD AND SYSTEM, AND APPARATUS

CROSS-REFERENCE TO RELATED APPLICATIONS

This application is a continuation of International Patent Application No. PCT/CN2015/078589 filed on May 8, 2015, which claims priority to Chinese Patent Application No. 201410478353.2 filed on Sep. 18, 2014. The disclosures of the aforementioned applications are hereby incorporated by reference in their entireties.

TECHNICAL FIELD

Embodiments of the present disclosure relate to the communications technologies, and in particular, to a terminal device positioning method and system, and an apparatus.

BACKGROUND

Currently, in the industry, a research direction for indoor navigation generally includes an Assisted Global Positioning System (A-GPS) based on a mobile network, a pseudosatellite (pseudolite), a wireless local area network (WLAN), radio frequency identification (RFID), ZIGBEE, BLUETOOTH (BT), ULTRA-WIDEBAND (UWB) radio, another geomagnetic satellite or terrestrial digital communications, a broadcast signal, infrared positioning, optical tracking positioning, computer vision positioning, ultrasonic positioning, and the like. For the foregoing technologies, a part is mainly used for navigation positioning, and a part is mainly used for communications and can provide a positioning service, for example, the WLAN.

Currently, for indoor positioning for a medium or large-sized building, a distributed antenna system (DAS) is mainly used. The DAS includes a base station, a coupler, a power splitter, and an antenna. Channel information of a terminal device is received using each antenna, and the channel information is returned to a base station device using a feeder when the terminal device sends or receives a signal. The base station compares the obtained channel information of the terminal device with pre-stored channel information of each indoor place, and uses a location closest to the channel information of the terminal device as a location of the terminal device, to implement terminal device positioning.

However, in an actual operation process, channel information of each location pre-stored in a base station is relatively fixed. Due to a change of a surrounding environment (For example, there is another interference signal), channel information constantly changes when a terminal device receives or sends a signal. Consequently, accuracy of terminal device positioning is relatively low.

SUMMARY

The present disclosure provides a terminal device positioning method and system, and an apparatus in order to resolve a problem, where due to a change of a surrounding environment, channel information constantly changes when a terminal device receives or sends a signal, and consequently, accuracy of terminal device positioning is relatively low.

According to a first aspect, the present disclosure provides a base station, including a receiving module configured to receive at least one second signal, or receive a first signal and at least one second signal, where the first signal is sent by a terminal device to an antenna terminal, and the at least one second signal is generated after each antenna terminal in at least one antenna terminal performs delay processing or frequency conversion processing on the first signal, and a processing module configured to obtain location information of the terminal device by means of calculation according to the at least one second signal or according to the first signal and the at least one second signal.

With reference to the first aspect, in a first possible implementation manner of the first aspect, if the receiving module receives only the at least one second signal, the processing module is further configured to separately obtain, according to the at least one second signal, a first delay offset value corresponding to each second signal, and obtain the location information of the terminal device by means of calculation using a typical channel transmission model according to the at least one first delay offset value and at least one piece of first location information, where the first location information is location information of an antenna terminal corresponding to one of the first delay offset values, or obtain first location information of an antenna terminal corresponding to each first delay offset value, obtain a first signal strength of a second signal on the antenna terminal corresponding to each first delay offset value, and obtain the location information of the terminal device by means of calculation using a typical channel transmission model according to at least one piece of the first location information and at least one of the first signal strengths.

With reference to the first aspect, in a second possible implementation manner of the first aspect, if the receiving module receives the first signal and the at least one second signal, the processing module is further configured to separately obtain, according to the at least one second signal, a second delay offset value of each second signal relative to the first signal, and obtain the location information of the terminal device by means of calculation using a typical channel transmission model according to the at least one second delay offset value and at least one piece of second location information, where the second location information is location information of an antenna terminal corresponding to one of the second delay offset values, or obtain second location information of an antenna terminal corresponding to each second delay offset value, obtain a second signal strength of a second signal on the antenna terminal corresponding to each second delay offset value, and obtain the location information of the terminal device by means of calculation using a typical channel transmission model according to at least one piece of the second location information and at least one of the second signal strengths.

With reference to the first aspect, in a third possible implementation manner of the first aspect, if the receiving module receives only the at least one second signal, the processing module is further configured to separately obtain, according to the at least one second signal, a first frequency offset value corresponding to each second signal, and obtain the location information of the terminal device by means of calculation using a typical channel transmission model according to the at least one first frequency offset value and at least one piece of third location information, where the third location information is location information of an antenna terminal corresponding to one of the first frequency offset values, or obtain third location information of an antenna terminal corresponding to each first frequency offset value, obtain a third signal strength of a second signal on the antenna terminal corresponding to each first frequency offset value, and obtain the location information of the terminal device by means of calculation using a typical channel transmission model according to at least one piece of the third location information and at least one of the third signal strengths.

With reference to the first aspect, in a fourth possible implementation manner of the first aspect, if the receiving module receives the first signal and the at least one second signal, the processing module is further configured to separately obtain, according to the at least one second signal, a second frequency offset value of each second signal relative to the first signal, and obtain the location information of the terminal device by means of calculation using a typical channel transmission model according to the at least one second frequency offset value and at least one piece of fourth location information, where the fourth location information is location information of an antenna terminal corresponding to one of the second frequency offset values, or obtain fourth location information of an antenna terminal corresponding to each second frequency offset value, obtain a fourth signal strength of a second signal on the antenna terminal corresponding to each second frequency offset value, and obtain the location information of the terminal device by means of calculation using a typical channel transmission model according to at least one piece of the fourth location information and at least one of the fourth signal strengths.

According to a second aspect, the present disclosure provides an antenna terminal, including a receiving module configured to receive a first signal sent by a terminal device, a processing module configured to perform delay processing or frequency conversion processing on the first signal to generate a second signal, and a sending module configured to send the second signal to a base station such that the base station obtains location information of the terminal device by means of calculation according to the second signal.

With reference to the second aspect, in a first possible implementation manner of the second aspect, before performing delay processing or frequency conversion processing on the first signal to generate the second signal, the processing module is further configured to perform power compensation processing on the first signal according to a preset gain, to obtain the first signal obtained after the compensation processing.

With reference to the second aspect or the first possible implementation manner of the second aspect, in a second possible implementation manner of the second aspect, the processing module is further configured to perform delay processing on the first signal according to a preconfigured delay offset value to generate the second signal, or perform filtering processing on the first signal to obtain the first signal obtained after clutter filtering, and perform, according to a preconfigured frequency offset value, frequency conversion processing on the first signal obtained after the clutter filtering, to generate the second signal.

According to a third aspect, the present disclosure provides a terminal device positioning method, including receiving at least one second signal, or receiving a first signal and at least one second signal, where the first signal is sent by a terminal device to an antenna terminal, and the at least one second signal is generated after each antenna terminal in at least one antenna terminal performs delay processing or frequency conversion processing on the first signal, and obtaining location information of the terminal device by means of calculation according to the at least one second signal or according to the first signal and the at least one second signal.

With reference to the third aspect, in a first possible implementation manner of the third aspect, if only the at least one second signal is received, obtaining the location information of the terminal device by means of calculation according to the at least one second signal or according to the first signal and the at least one second signal includes separately obtaining, according to the at least one second signal, a first delay offset value corresponding to each second signal, and obtaining the location information of the terminal device by means of calculation using a typical channel transmission model according to the at least one first delay offset value and at least one piece of first location information, where the first location information is location information of an antenna terminal corresponding to one of the first delay offset values, or obtaining first location information of an antenna terminal corresponding to each first delay offset value, obtaining a first signal strength of a second signal on the antenna terminal corresponding to each first delay offset value, and obtaining the location information of the terminal device by means of calculation using a typical channel transmission model according to at least one piece of the first location information and at least one of the first signal strengths.

With reference to the third aspect, in a second possible implementation manner of the third aspect, if the first signal and the at least one second signal are received, obtaining the location information of the terminal device by means of calculation according to the at least one second signal or according to the first signal and the at least one second signal includes separately obtaining, according to the at least one second signal, a second delay offset value of each second signal relative to the first signal, and obtaining the location information of the terminal device by means of calculation using a typical channel transmission model according to the at least one second delay offset value and at least one piece of second location information, where the second location information is location information of an antenna terminal corresponding to one of the second delay offset values, or obtaining second location information of an antenna terminal corresponding to each second delay offset value, obtaining a second signal strength of a second signal on the antenna terminal corresponding to each second delay offset value, and obtaining the location information of the terminal device by means of calculation using a typical channel transmission model according to at least one piece of the second location information and at least one of the second signal strengths.

With reference to the third aspect, in a third possible implementation manner of the third aspect, if only the at least one second signal is received, obtaining the location information of the terminal device by means of calculation according to the at least one second signal or according to the first signal and the at least one second signal includes separately obtaining, according to the at least one second signal, a first frequency offset value corresponding to each second signal, and obtaining the location information of the terminal device by means of calculation using a typical channel transmission model according to the at least one first frequency offset value and at least one piece of third location information, where the third location information is location information of an antenna terminal corresponding to one of the first frequency offset values, or obtaining third location information of an antenna terminal corresponding to each first frequency offset value, obtaining a third signal strength of a second signal on the antenna terminal corresponding to each first frequency offset value, and obtaining the location information of the terminal device by means of calculation using a typical channel transmission model according to at least one piece of the third location information and at least one of the third signal strengths.

With reference to the third aspect, in a fourth possible implementation manner of the third aspect, if the first signal and the at least one second signal are received, obtaining the location information of the terminal device by means of calculation according to the at least one second signal or according to the first signal and the at least one second signal includes separately obtaining, according to the at least one second signal, a second frequency offset value of each second signal relative to the first signal, and obtaining the location information of the terminal device by means of calculation using a typical channel transmission model according to the at least one second frequency offset value and at least one piece of fourth location information, where the fourth location information is location information of an antenna terminal corresponding to one of the second frequency offset values, or obtaining fourth location information of an antenna terminal corresponding to each second frequency offset value, obtaining a fourth signal strength of a second signal on the antenna terminal corresponding to each second frequency offset value, and obtaining the location information of the terminal device by means of calculation using a typical channel transmission model according to at least one piece of the fourth location information and at least one of the fourth signal strengths.

According to a fourth aspect, the present disclosure provides a terminal device positioning method, including receiving a first signal sent by a terminal device, performing delay processing or frequency conversion processing on the first signal to generate a second signal, and sending the second signal to a base station such that the base station obtains location information of the terminal device by means of calculation according to the second signal.

With reference to the fourth aspect, in a first possible implementation manner of the fourth aspect, before performing delay processing or frequency conversion processing on the first signal to generate a second signal, the method further includes performing power compensation processing on the first signal according to a preset gain, to obtain the first signal obtained after the compensation processing.

With reference to the fourth aspect or the first possible implementation manner of the fourth aspect, in a second possible implementation manner of the fourth aspect, performing delay processing or frequency conversion processing on the first signal to generate a second signal includes performing delay processing on the first signal according to a preconfigured delay offset value to generate the second signal, or performing filtering processing on the first signal to obtain the first signal obtained after clutter filtering, and performing, according to a preconfigured frequency offset value, frequency conversion processing on the first signal obtained after the clutter filtering, to generate the second signal.

According to a fifth aspect, the present disclosure provides a terminal device positioning system, including a base station and at least one antenna terminal, where each antenna terminal is configured to receive a first signal sent by a terminal device, perform delay processing or frequency conversion processing on the first signal to generate a second signal, and send the second signal to the base station, and the base station is configured to receive at least one second signal, or receive a first signal and at least one second signal, and obtain location information of the terminal device by means of calculation according to the at least one second signal or according to the first signal and the at least one second signal, where the first signal is sent by the terminal device to an antenna terminal, and the at least one second signal is generated after each antenna terminal in at least one antenna terminal performs delay processing or frequency conversion processing on the first signal.

With reference to the fifth aspect, in a first possible implementation manner of the fifth aspect, each antenna terminal includes an antenna and a delay device, and the delay device is configured to perform delay processing on the first signal according to a preconfigured delay offset value, to generate the second signal.

With reference to the first possible implementation manner of the fifth aspect, in a second possible implementation manner of the fifth aspect, each antenna terminal further includes a power amplifier, and before the delay device performs delay processing on the first signal according to the preconfigured delay offset value, to generate the second signal, the power amplifier is configured to perform power compensation processing on the first signal according to a preset gain, to obtain the first signal obtained after the compensation processing.

With reference to any one of the fifth aspect, the first possible implementation manner of the fifth aspect, or the second possible implementation manner of the fifth aspect, in a third possible implementation manner of the fifth aspect, the base station is further configured to separately obtain, according to the at least one second signal, a first delay offset value corresponding to each second signal, and obtain the location information of the terminal device by means of calculation using a typical channel transmission model according to the at least one first delay offset value and at least one piece of first location information, where the first location information is location information of an antenna terminal corresponding to one of the first delay offset values, or obtain first location information of an antenna terminal corresponding to each first delay offset value, obtain a first signal strength of a second signal on the antenna terminal corresponding to each first delay offset value, and obtain the location information of the terminal device by means of calculation using a typical channel transmission model according to at least one piece of the first location information and at least one of the first signal strengths.

With reference to the fifth aspect, in a fourth possible implementation manner of the fifth aspect, each antenna terminal includes an antenna, a filter, and a frequency conversion device, the filter is configured to perform filtering processing on the first signal to obtain the first signal obtained after clutter filtering, and the frequency conversion device is configured to perform, according to a preconfigured frequency offset value, frequency conversion processing on the first signal obtained after the clutter filtering, to generate the second signal.

With reference to the fourth possible implementation manner of the fifth aspect, in a fifth fourth possible implementation manner of the fifth aspect, each antenna terminal further includes the power amplifier, and before the filtering device performs, according to a preconfigured frequency offset value, frequency conversion processing on the first signal obtained after clutter filtering, to generate the second signal, the power amplifier is configured to perform power compensation processing on the first signal according to the preset gain to obtain the first signal obtained after the compensation processing.

With reference to any one of the fifth aspect, the fourth possible implementation manner of the fifth aspect, or the fifth possible implementation manner of the fifth aspect, in a sixth possible implementation manner of the fifth aspect, the base station is further configured to separately obtain, according to the at least one second signal, a first frequency offset value corresponding to each second signal, and obtain the location information of the terminal device by means of calculation using a typical channel transmission model according to the at least one first frequency offset value and at least one piece of third location information, where the third location information is location information of an antenna terminal corresponding to one of the first frequency offset values, or obtain third location information of an antenna terminal corresponding to each first frequency offset value, obtain a third signal strength of a second signal on the antenna terminal corresponding to each first frequency offset value, and obtain the location information of the terminal device by means of calculation using a typical channel transmission model according to at least one piece of the third location information and at least one of the third signal strengths.

With reference to any one of the fifth aspect, the first, the second, the fourth, or the fifth possible implementation manner of the fifth aspect, in a seventh possible implementation manner of the fifth aspect, the system further includes an antenna, where the antenna is configured to receive the first signal sent by a user terminal, and send the first signal to the base station when each antenna terminal sends the second signal to the base station.

With reference to the seventh possible implementation manner of the fifth aspect, in an eighth possible implementation manner of the fifth aspect, the base station is further configured to separately obtain, according to the at least one second signal, a second delay offset value of each second signal relative to the first signal, and obtain the location information of the terminal device by means of calculation using a typical channel transmission model according to the at least one second delay offset value and at least one piece of second location information, where the second location information is location information of an antenna terminal corresponding to one of the second delay offset values, or obtain second location information of an antenna terminal corresponding to each second delay offset value, obtain a second signal strength of a second signal on the antenna terminal corresponding to each second delay offset value, and obtain the location information of the terminal device by means of calculation using a typical channel transmission model according to at least one piece of the second location information and at least one of the second signal strengths.

With reference to the seventh possible implementation manner of the fifth aspect, in a ninth possible implementation manner of the fifth aspect, the base station is further configured to separately obtain, according to the at least one second signal, a second frequency offset value of each second signal relative to the first signal, and obtain the location information of the terminal device by means of calculation using a typical channel transmission model according to the at least one second frequency offset value and at least one piece of fourth location information, where the fourth location information is location information of an antenna terminal corresponding to one of the second frequency offset values, or obtain fourth location information of an antenna terminal corresponding to each second frequency offset value, obtain a fourth signal strength of a second signal on the antenna terminal corresponding to each second frequency offset value, and obtain the location information of the terminal device by means of calculation using a typical channel transmission model according to at least one piece of the fourth location information and at least one of the fourth signal strengths.

With reference to any one of the fifth aspect, or the first to the ninth possible implementation manners of the fifth aspect, in a tenth possible implementation manner of the fifth aspect, the system further includes at least one positioning apparatus, where the positioning apparatus is configured to further perform delay processing or frequency conversion processing on the at least one second signal.

According to the terminal device positioning method and system, and the apparatus that are provided in the present disclosure, delay processing or frequency conversion processing is performed on a first signal sent by a terminal device. A base station obtains specific location information of the terminal device by means of calculation according to processed at least one second signal and according to a change of the signal. The specific location information of the terminal device is obtained using multiple second signals obtained after the delay processing or the frequency conversion processing is not affected by an external environment in comparison with unsteady channel information. Therefore, terminal device positioning accuracy is effectively improved.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

A terminal device described in the embodiments of the present disclosure includes a mobile device that can perform uplink and downlink communication, for example, a mobile phone, a mobile computer, a tablet, or another intelligent terminal.

Figure 1:
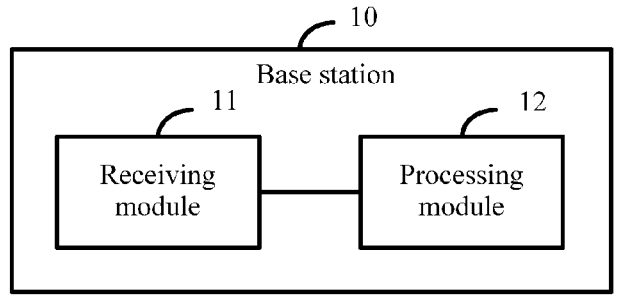
FIG. 1 is a schematic structural diagram of a first embodiment of a base station according to the present disclosure.

FIG. 1 is a schematic structural diagram of a first embodiment of a base station according to the present disclosure. As shown in FIG. 1, the base station 10 includes a receiving module 11 configured to receive at least one second signal, or receive a first signal and at least one second signal, where the first signal is sent by a terminal device to an antenna terminal, and the at least one second signal is generated after each antenna terminal in at least one antenna terminal performs delay processing or frequency conversion processing on the first signal, and a processing module 12 configured to obtain location information of the terminal device by means of calculation according to the at least one second signal or according to the first signal and the at least one second signal.

In this embodiment, the antenna terminal has a delay function or a frequency conversion processing function, and can perform delay processing or frequency conversion processing on the first signal of the terminal device. The first signal may be an uplink signal sent by the terminal device, or may be a coupled signal of an uplink signal. In specific implementation, only one signal of the terminal device needs to be processed to position the terminal device. The antenna terminal performs real-time processing on the first signal of the terminal device, and sends the second signal such that the base station 10 may further determine the location information of the terminal device in real time. Each second signal is generated after one antenna terminal performs delay processing or frequency conversion processing on the first signal. Therefore, a quantity of second signals is the same as a quantity of antenna terminals, and the second signal is in a one-to-one correspondence with the antenna terminal.

The base station 10 provided in this embodiment receives at least one second signal generated after at least one antenna terminal performs delay processing or frequency conversion processing on a first signal sent by a terminal device. The base station 10 obtains specific location information of the terminal device by means of calculation according to the at least one second signal obtained after the processing and according to a change of the signal. The specific location information of the terminal device is obtained using multiple second signals obtained after the delay processing or the frequency conversion processing. This is not affected by an external environment in comparison with unsteady channel information in order to effectively improve terminal device positioning accuracy.

In a second embodiment of the base station 10 of the present disclosure, on a basis of the foregoing embodiment, when multiple antenna terminals separately perform delay processing on the first signal, if the receiving module 11 receives only the at least one second signal, the processing module 12 is further configured to separately obtain, according to the at least one second signal, a first delay offset value corresponding to each second signal, and obtain the location information of the terminal device by means of calculation using a typical channel transmission model according to the at least one first delay offset value and at least one piece of first location information, where the first location information is location information of an antenna terminal corresponding to one of the first delay offset values, or obtain first location information of an antenna terminal corresponding to each first delay offset value, obtain a first signal strength of a second signal on the antenna terminal corresponding to each first delay offset value, and obtain the location information of the terminal device by means of calculation using a typical channel transmission model according to at least one piece of the first location information and at least one of the first signal strengths.

In this embodiment, a module with a delay processing function is integrated into each antenna terminal, and each antenna terminal can process the first signal only according to a unique delay offset value. Therefore, a quantity of the at least one first delay offset value obtained by the processing module 12 is the same as a quantity of antenna terminals sending the at least one second signal, that is, the antenna terminal, the second signal, and the first delay offset value are in a one-to-one correspondence with one another.

During installation configuration of the base station 10, the base station 10 pre-stores location information of a module that has a positioning function and integrated into antenna terminals corresponding to different delay offset values, that is, location information of each antenna terminal is fixed. An energy value of each second signal is obtained by means of detection such that a signal strength of the second signal can be detected. Each second signal corresponds to one first signal strength, and the second signal, the first signal strength, and the first location information are also in a one-to-one correspondence with one another.

Further, the location information of the terminal device may be obtained by means of calculation using the typical channel transmission model according to the first location information and the first delay offset value of the antenna terminal corresponding to each second signal.

Alternatively, the location information of the terminal device may be obtained by means of calculation using the typical channel transmission model according to the first signal strength of the second signal and the first location information of the antenna terminal corresponding to each second signal.

Details are determined according to an application situation. This is not limited in this embodiment.

A manner for obtaining the at least one first delay offset value is mainly as follows. After the base station 10 delivers downlink information to the terminal device, when an uplink signal has not been returned within an empirical time of returning uplink information previously, a first delay offset value of the received second signal is obtained by means of timing.

Optionally, when multiple antenna terminals separately perform delay processing on the first signal, if the receiving module 11 receives the first signal and the at least one second signal, the processing module 12 is further configured to separately obtain, according to the at least one second signal, a second delay offset value of each second signal relative to the first signal, and obtain the location information of the terminal device by means of calculation using a typical channel transmission model according to the at least one second delay offset value and at least one piece of second location information, where the second location information is location information of an antenna terminal corresponding to one of the second delay offset values, or obtain second location information of an antenna terminal corresponding to each second delay offset value, obtain a second signal strength of a second signal on the antenna terminal corresponding to each second delay offset value, and obtain the location information of the terminal device by means of calculation using a typical channel transmission model according to at least one piece of the second location information and at least one of the second signal strengths.

In this embodiment, a feature different from the foregoing implementation manner is that a module with a delay function is not disposed in the antenna, that is, the base station 10 receives the first signal on which delay processing is not performed. Therefore, when the second delay offset value is obtained, a moment at which the first signal is received may be used as a reference base to obtain a delay offset of each second signal relative to the first signal received by the base station 10.

After the at least one second delay offset value is obtained, a processing manner is the same as the foregoing manner, that is, a pre-stored correspondence between a delay offset value and location information is queried to obtain at least one piece of the second location information in order to further determine the location information of the terminal device.

Optionally, when multiple antenna terminals separately perform frequency conversion processing on the first signal, if the receiving module 11 receives only the at least one second signal, the processing module 12 is further configured to separately obtain, according to the at least one second signal, a first frequency offset value corresponding to each second signal, and obtain the location information of the terminal device by means of calculation using a typical channel transmission model according to the at least one first frequency offset value and at least one piece of third location information, where the third location information is location information of an antenna terminal corresponding to one of the first frequency offset values, or obtain third location information of an antenna terminal corresponding to each first frequency offset value, obtain a third signal strength of a second signal on the antenna terminal corresponding to each first frequency offset value, and obtain the location information of the terminal device by means of calculation using a typical channel transmission model according to at least one piece of the third location information and at least one of the third signal strengths.

In this embodiment, a module with a frequency conversion processing function is integrated into each antenna terminal, and each antenna terminal can process the first signal only according to a unique frequency offset value. Therefore, a quantity of the at least one frequency offset value obtained by the processing module 12 is the same as a quantity of antenna terminals sending the at least one second signal, that is, the antenna terminal, the second signal, and the first frequency offset value are in a one-to-one correspondence with one another.

During installation configuration of the base station 10, the base station 10 pre-stores location information of a module that has a positioning function and integrated into antenna terminals corresponding to different frequency offset values, that is, location information of each antenna terminal is fixed. An energy value of each second signal is obtained by means of detection such that a signal strength of the second signal can be detected. Each second signal corresponds to one third signal strength, and the second signal, the third signal strength, and the third location information are also in a one-to-one correspondence with one another.

Further, the location information of the terminal device may be obtained by means of calculation using the typical channel transmission model according to the third location information and the first frequency offset value of the antenna terminal corresponding to each second signal.

Alternatively, the location information of the terminal device may be obtained by means of calculation using the typical channel transmission model according to the third signal strength of the second signal and the third location information of the antenna terminal corresponding to each second signal.

Details are determined according to an application situation. This is not limited in this embodiment.

Optionally, when multiple antenna terminals separately perform frequency conversion processing on the first signal, if the receiving module 11 receives the first signal and the at least one second signal, the processing module 12 is further configured to separately obtain, according to the at least one second signal, a second frequency offset value of each second signal relative to the first signal, and obtain the location information of the terminal device by means of calculation using a typical channel transmission model according to the at least one second frequency offset value and at least one piece of fourth location information, where the fourth location information is location information of an antenna terminal corresponding to one of the second frequency offset values, or obtain fourth location information of an antenna terminal corresponding to each second frequency offset value, obtain a fourth signal strength of a second signal on the antenna terminal corresponding to each second frequency offset value, and obtain the location information of the terminal device by means of calculation using a typical channel transmission model according to at least one piece of the fourth location information and at least one of the fourth signal strengths.

In this embodiment, a feature different from the foregoing implementation manner is that a module with a frequency conversion function is not disposed in the antenna, that is, the base station 10 receives the first signal on which frequency conversion processing is not performed. Therefore, when the second frequency offset value is obtained, a frequency at which the first signal is received may be used as a reference base to obtain a frequency offset of each second signal relative to the first signal received by the base station 10.

After the at least one second frequency offset value is obtained, a processing manner is the same as the foregoing manner, that is, a pre-stored correspondence between a frequency offset value and location information is queried to obtain the at least one piece of fourth location information in order to further determine the location information of the terminal device.

According to the base station 10 provided in this embodiment, a receiving module 11 receives at least one second signal, and a processing module 12 obtains a delay offset value or a frequency offset value of each second signal, then queries a pre-stored correspondence between a delay offset value and location information or a pre-stored correspondence between a frequency offset value and location information, obtains pieces of location information whose quantity is the same as a quantity of second signals and/or obtains a signal strength of a second signal corresponding to each piece of location information, and obtains location information of a terminal device using a typical channel transmission model. Alternatively, a receiving module 11 receives at least one second signal and a first signal, and a processing module 12 obtains a delay offset value or a frequency offset value of each second signal relative to the first signal, and obtains location information of a terminal device in a same manner. This does not depend on any action of the terminal device, requires no manual processing, and is not affected by an external environment. Therefore, terminal device positioning accuracy is effectively improved, and costs are reduced.

Figure 2:
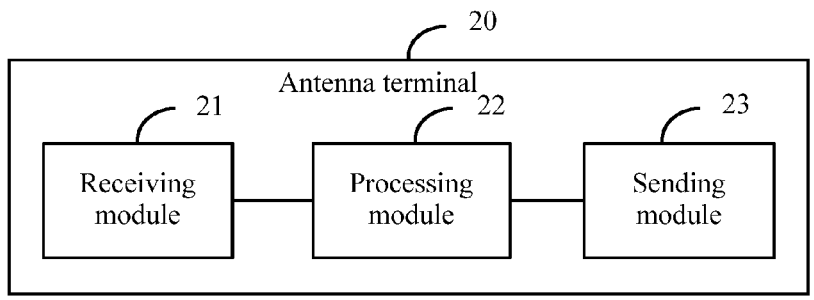
FIG. 2 is a schematic structural diagram of a first embodiment of an antenna terminal according to the present disclosure.

FIG. 2 is a schematic structural diagram of a first embodiment of an antenna terminal according to the present disclosure. As shown in FIG. 2, the antenna terminal 20 includes a receiving module 21, a processing module 22, and a sending module 23. The receiving module 21 is configured to receive a first signal sent by a terminal device. The processing module 22 is configured to perform delay processing or frequency conversion processing on the first signal to generate a second signal. The sending module 23 is configured to send the second signal to a base station such that the base station obtains location information of the terminal device by means of calculation according to the second signal.

In this embodiment, the first signal includes an uplink signal sent by the terminal device, and also includes a coupled signal of an uplink signal. The receiving module 21 receives a first signal of the terminal device. The processing module 22 performs delay processing or frequency conversion processing on the first signal to generate a second signal. Particularly, a time for the delay processing is a fixed preset delay value, and one antenna terminal 20 can generate only one second signal after performing delay processing on the first signal. Likewise, if the antenna terminal 20 performs frequency conversion processing on the first signal, a frequency offset of the frequency conversion processing is a fixed preset frequency offset value of a device, and one antenna terminal 20 can generate only one second signal after performing frequency conversion processing on the first signal.

The antenna terminal 20 provided in this embodiment receives a first signal of a terminal device, performs delay processing or frequency conversion processing on the first signal, and sends a generated second signal to a base station such that the base station obtains specific location information of the terminal device by means of calculation according to at least one second signal sent by at least one antenna terminal 20 and according to a change of the signal. The specific location information of the terminal device is obtained using multiple second signals obtained after the delay processing or the frequency conversion processing. This is not affected by an external environment in comparison with unsteady channel information in order to effectively improve terminal device positioning accuracy.

In a second embodiment of the antenna terminal 20 of the present disclosure, on a basis of the foregoing embodiment, before the processing module 22 performs delay processing or frequency conversion processing on the first signal to generate the second signal, the processing module 22 is further configured to perform power compensation processing on the first signal according to a preset gain, to obtain the first signal obtained after the compensation processing.

In this embodiment, a signal has a specific loss in a transmission process. Therefore, to maintain a required signal strength, power amplification may be performed on the first signal before the processing, to compensate for a loss in the delay processing or frequency conversion processing process, thereby achieving a desired signal strength.

The processing module 22 is further configured to perform delay processing on the first signal according to a preconfigured delay offset value to generate the second signal, or perform filtering processing on the first signal to obtain the first signal obtained after clutter filtering, and perform, according to a preconfigured frequency offset value, frequency conversion processing on the first signal obtained after the clutter filtering, to generate the second signal.

In this embodiment, the first signal may include the uplink signal sent by the terminal device, and further include multiple coupled signals. Therefore, the first signal needs to be filtered before the frequency conversion processing process is performed, to obtain a signal component of a required frequency in the first signal, that is, to select a required first signal. The delay offset value is in a one-to-one correspondence with the second signal, or the frequency offset value is in a one-to-one correspondence with the second signal.

The antenna terminal 20 provided in this embodiment performs delay processing or frequency conversion processing on a first signal using the processing module 22, to obtain a second signal, and sends the second signal to a base station. Therefore, the base station performs processing according to at least one second signal sent by at least one antenna terminal 20, to obtain a delay offset value or a frequency offset value of each second signal, and obtains location information of a terminal device using a typical channel transmission model. Alternatively, a receiving module receives at least one second signal and a first signal, and a base station obtains a delay offset value or a frequency offset value of each second signal relative to the first signal, and obtains location information of a terminal device in a same manner. This does not depend on any action of the terminal device, requires no manual processing, and is not affected by an external environment. Therefore, terminal device positioning accuracy is effectively improved, and costs are reduced.

Figure 3:
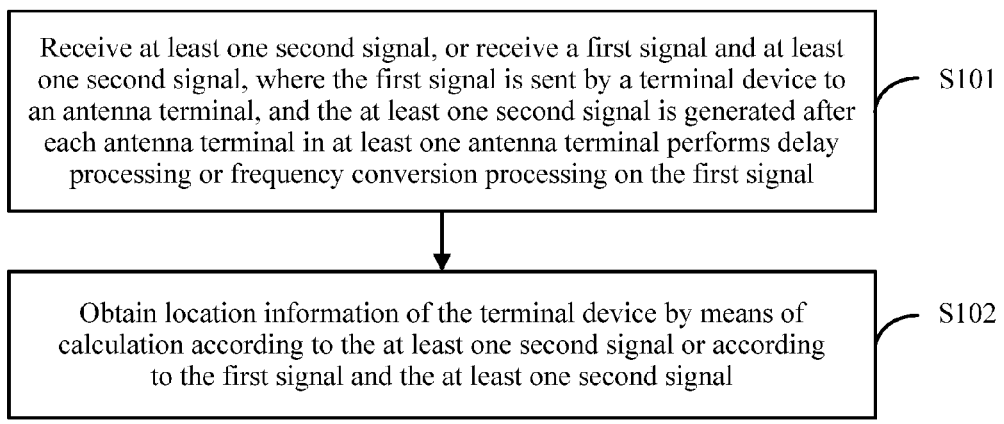
FIG. 3 is a flowchart of a first embodiment of a terminal device positioning method according to the present disclosure.

FIG. 3 is a flowchart of a first embodiment of a terminal device positioning method according to the present disclosure. As shown in FIG. 3, this embodiment is executed by a base station, and the method further includes the following steps.

Step S101: Receive at least one second signal, or receive a first signal and at least one second signal, where the first signal is sent by a terminal device to an antenna terminal, and the at least one second signal is generated after each antenna terminal in at least one antenna terminal performs delay processing or frequency conversion processing on the first signal.

In this embodiment, the second signal received by the base station is generated after the antenna terminal performs delay processing or frequency conversion processing on the first signal. Each antenna terminal can generate only one second signal by means of processing. It indicates that there is an antenna terminal that does not have a delay processing or frequency conversion processing function if the base station further receives the first signal. The received second signal is directly sent to the base station such that the base station performs processing.

Step S102: Obtain location information of the terminal device by means of calculation according to the at least one second signal or according to the first signal and the at least one second signal.

In this embodiment, the present disclosure sets no limitation on a manner for processing a signal by the base station. A frequently-used processing manner is to obtain a location of the terminal device by means of calculation using a typical channel transmission model, and implement terminal device positioning.

According to the terminal device positioning method provided in this embodiment, a base station receives at least one second signal generated after at least one antenna terminal performs delay processing or frequency conversion processing on a first signal sent by a terminal device, and obtains specific location information of the terminal device by means of calculation according to the processed at least one second signal and according to a change of the signal. The specific location information of the terminal device is obtained using multiple second signals obtained after the delay processing or the frequency conversion processing. This is not affected by an external environment in comparison with unsteady channel information in order to effectively improve terminal device positioning accuracy.

Figure 4:
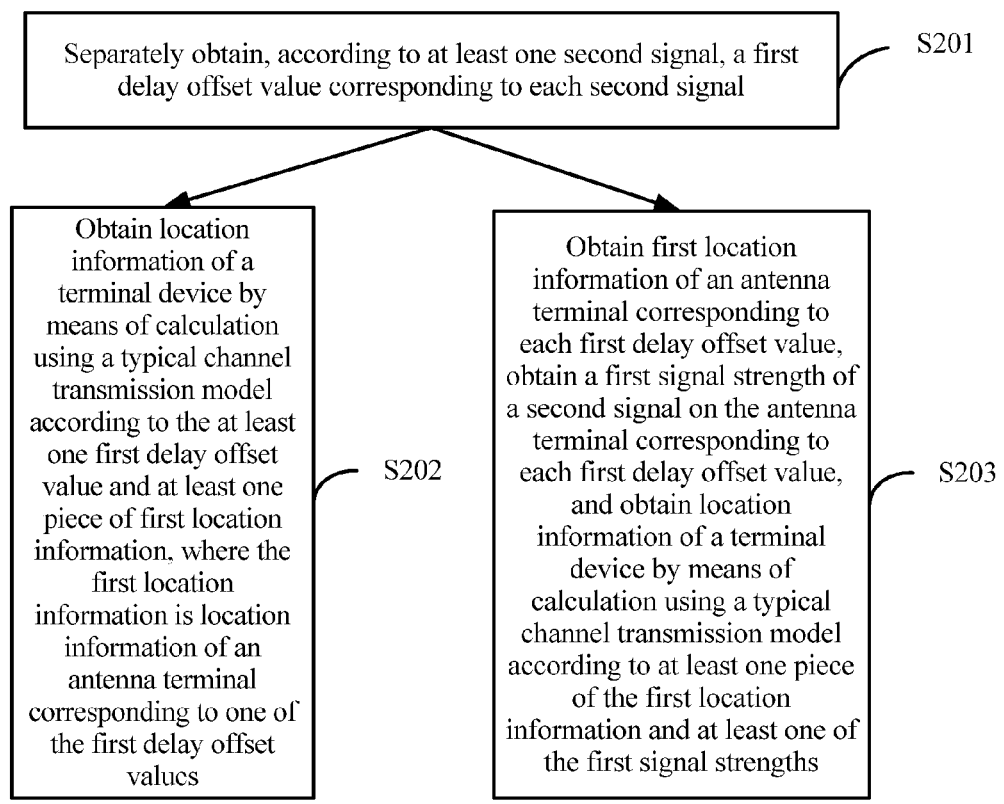
FIG. 4 is a flowchart of a second embodiment of a terminal device positioning method according to the present disclosure.

FIG. 4 is a flowchart of a second embodiment of a terminal device positioning method according to the present disclosure. As shown in FIG. 4, on a basis of the foregoing embodiment shown in FIG. 3, if a module with a delay processing function is integrated into an antenna terminal corresponding to the base station, and the base station receives only the at least one second signal, obtaining the location information of the terminal device by means of calculation according to the at least one second signal or according to the first signal and the at least one second signal in step S102 includes the following specific implementation steps.

Step S201: Separately obtain, according to the at least one second signal, a first delay offset value corresponding to each second signal.

In this embodiment, a manner for obtaining the at least one first delay offset value is mainly as follows. After the base station delivers downlink information to the terminal device, when an uplink signal has not been returned within an empirical time of returning uplink information previously, a first delay offset value of the received second signal is obtained by means of timing.

Step S202: Obtain the location information of the terminal device by means of calculation using a typical channel transmission model according to the at least one first delay offset value and at least one piece of first location information, where the first location information is location information of an antenna terminal corresponding to one of the first delay offset values.

In this embodiment, a quantity of obtained at least one delay offset value is the same as a quantity of antenna terminals sending the at least one second signal, that is, the antenna terminal, the second signal, and the first delay offset value are in a one-to-one correspondence with one another. During installation configuration of the base station, the base station pre-stores location information of a module that has a positioning function and that is integrated into antenna terminals corresponding to different delay offset values, that is, location information of each antenna terminal is fixed.

After the first location information of the antenna terminal corresponding to the second signal is obtained, the location information of the terminal device may be obtained by means of calculation by directly using the typical channel transmission model directly according to the at least one piece of location information the at least one first delay offset value, to implement accurate terminal device positioning.

Step S203: Obtain first location information of an antenna terminal corresponding to each first delay offset value, obtain a first signal strength of a second signal on the antenna terminal corresponding to each first delay offset value, and obtain the location information of the terminal device by means of calculation using a typical channel transmission model according to at least one piece of the first location information and at least one of the first signal strengths.

In this embodiment, an energy value of each second signal is obtained by means of detection such that a signal strength of the second signal can be detected. Each second signal corresponds to one first signal strength, and the second signal, the first signal strength, and the first location information are also in a one-to-one correspondence with one another.

After the first signal strength of the second signal corresponding to the antenna terminal is obtained, the location information of the terminal device is obtained by means of calculation using the typical channel transmission model with reference to the first location information of the antenna terminal corresponding to the second signal, to implement accurate terminal device positioning.

The foregoing steps S202 and S203 are two parallel technical solutions after the first delay offset value is obtained, and may be selected according to an actual situation in practical application. This is not limited in the present disclosure.

According to the terminal device positioning method provided in this embodiment, a delay offset value of each second signal relative to an empirical time is obtained using received at least one second signal, and then a pre-stored correspondence between a delay offset value and location information is queried, to obtain pieces of location information whose quantity is the same as a quantity of second signals. Location information of a terminal device is obtained using a typical channel transmission model with reference to location information of an antenna terminal and a delay offset value corresponding to a second signal or with reference to location information of an antenna terminal corresponding to a second signal and a signal strength of a second signal corresponding to each piece of location information. This does not depend on any action of the terminal device, requires no manual processing, and is not affected by an external environment. Therefore, terminal device positioning accuracy is effectively improved, and costs are reduced.

Figure 5:
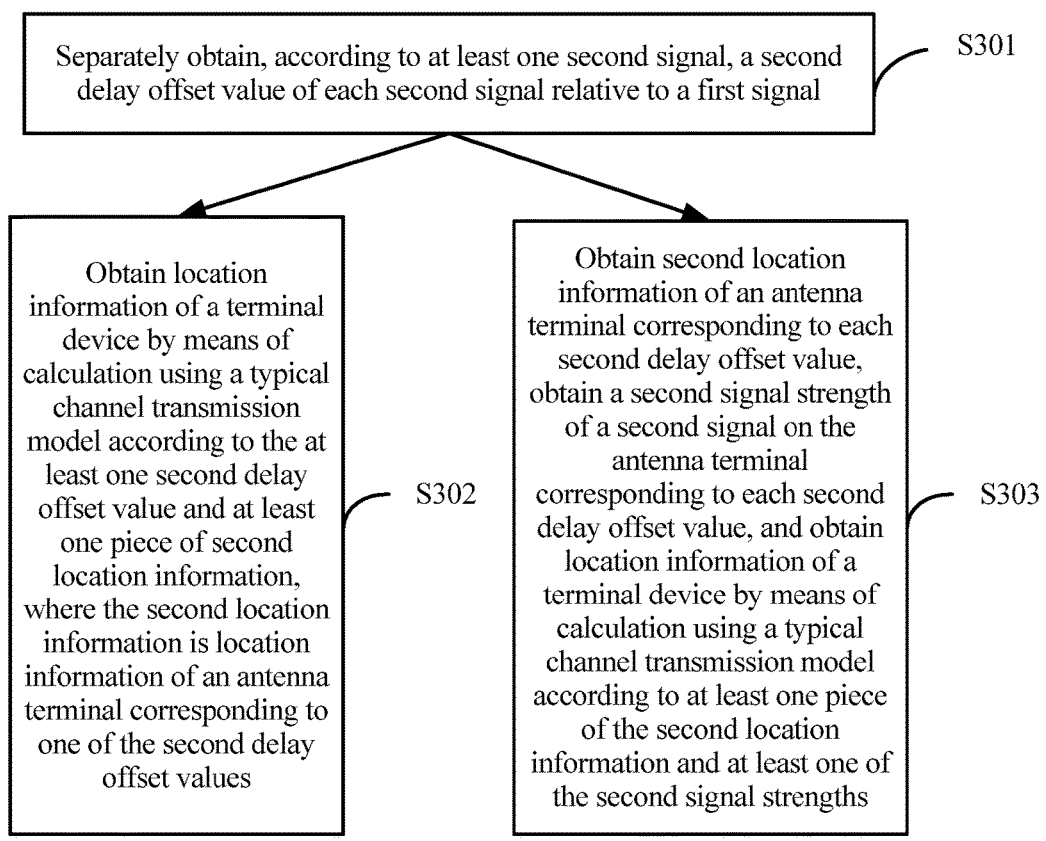
FIG. 5 is a flowchart of a third embodiment of a terminal device positioning method according to the present disclosure.

FIG. 5 is a flowchart of a third embodiment of a terminal device positioning method according to the present disclosure. As shown in FIG. 5, on a basis of the foregoing embodiment shown in FIG. 3, if a module with a delay processing function is integrated into an antenna terminal corresponding to the base station, there is an antenna terminal into which the module with a delay processing function is not integrated, and the base station receives the first signal and the at least one second signal, obtaining the location information of the terminal device by means of calculation according to the at least one second signal or according to the first signal and the at least one second signal in step S102 includes the following specific implementation steps.

Step S301: Separately obtain, according to the at least one second signal, a second delay offset value of each second signal relative to the first signal.

In this embodiment, a feature different from the foregoing implementation manner in FIG. 4 is that a module with a delay function is not disposed in the antenna, that is, the base station receives the first signal on which delay processing is not performed. Therefore, when the second delay offset value is obtained, a moment at which the first signal is received may be used as a reference base to obtain a delay offset of each second signal relative to the first signal received by the base station.

Step S302: Obtain the location information of the terminal device by means of calculation using a typical channel transmission model according to the at least one second delay offset value and at least one piece of second location information, where the second location information is location information of an antenna terminal corresponding to one of the second delay offset values.

In this embodiment, after the second location information of the antenna terminal corresponding to the second signal is obtained, the location information of the terminal device may be obtained by means of calculation by directly using the typical channel transmission model directly according to the at least one piece of location information and with reference to the at least one second delay offset value, to implement accurate terminal device positioning.

Step S303: Obtain second location information of an antenna terminal corresponding to each second delay offset value, obtain a second signal strength of a second signal on the antenna terminal corresponding to each second delay offset value, and obtain the location information of the terminal device by means of calculation using a typical channel transmission model according to at least one piece of the second location information and at least one of the second signal strengths.

In this embodiment, during installation configuration of the base station, the base station pre-stores location information of a module that has a positioning function and integrated into antenna terminals corresponding to different delay offset values, that is, location information of each antenna terminal is fixed. An energy value of each second signal is obtained by means of detection such that a signal strength of the second signal can be detected. Each second signal corresponds to one second signal strength, and the second signal, the second signal strength, and the second location information are also in a one-to-one correspondence with one another.

After the second signal strength of the second signal corresponding to the antenna terminal is obtained, the location information of the terminal device is obtained by means of calculation using the typical channel transmission model with reference to the second location information of the antenna terminal corresponding to the second signal, to implement accurate terminal device positioning.

The foregoing steps S302 and S303 are two parallel technical solutions after the second delay offset value is obtained, and may be selected according to an actual situation in practical application. This is not limited in the present disclosure.

According to the terminal device positioning method provided in this embodiment, a delay offset value of each second signal relative to a first signal is obtained using a received first signal and received at least one second signal, and then a pre-stored correspondence between a delay offset value and location information is queried, to obtain pieces of location information whose quantity is the same as a quantity of second signals. Location information of a terminal device is obtained using a typical channel transmission model with reference to location information of an antenna terminal and a delay offset value corresponding to a second signal or with reference to location information of an antenna terminal corresponding to a second signal and a signal strength of a second signal corresponding to each piece of location information. This does not depend on any action of the terminal device, requires no manual processing, and is not affected by an external environment. Therefore, terminal device positioning accuracy is effectively improved, and costs are reduced.

Figure 6:
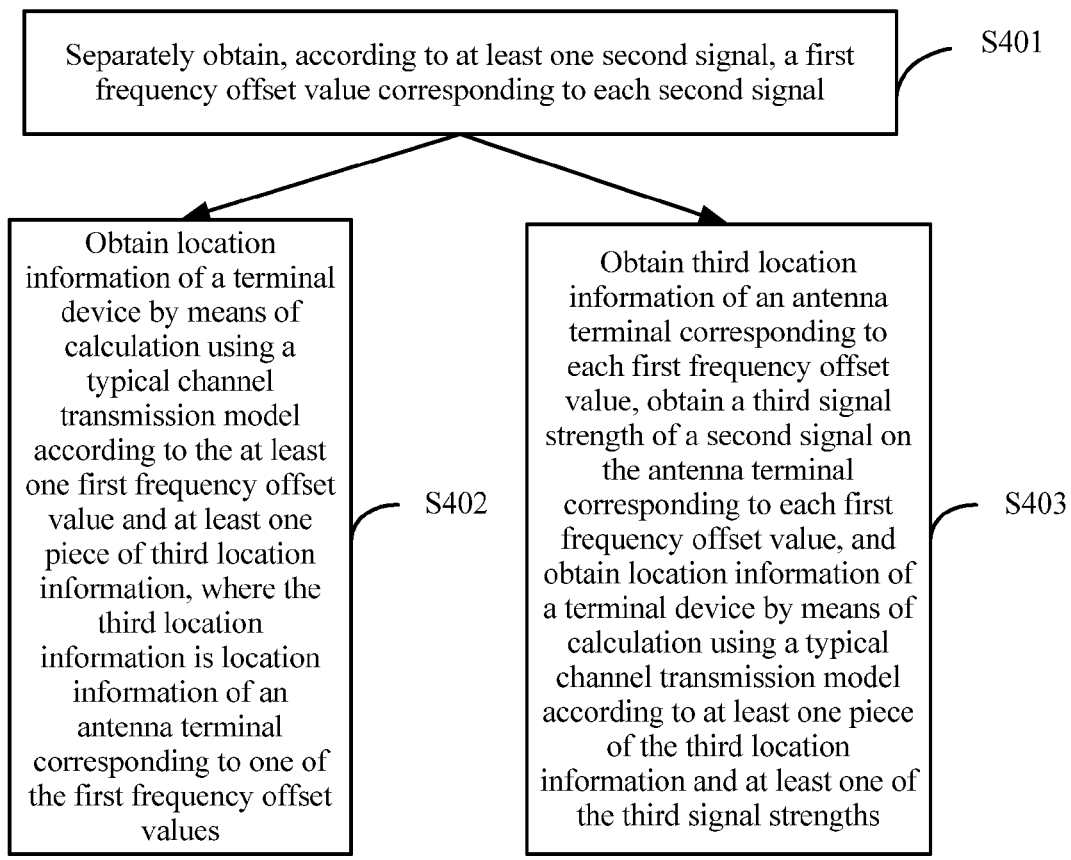
FIG. 6 is a flowchart of a fourth embodiment of a terminal device positioning method according to the present disclosure.

FIG. 6 is a flowchart of a fourth embodiment of a terminal device positioning method according to the present disclosure. As shown in FIG. 6, on a basis of the foregoing embodiment shown in FIG. 3, if a module with a frequency conversion processing function is integrated into an antenna terminal corresponding to the base station, and the base station receives only the at least one second signal, the obtaining location information of the terminal device by means of calculation according to the at least one second signal or according to the first signal and the at least one second signal in step S102 includes the following specific implementation steps.

Step S401: Separately obtain, according to the at least one second signal, a first frequency offset value corresponding to each second signal.

In this embodiment, a module with a frequency conversion processing function is integrated into each antenna terminal, and each antenna terminal can process the first signal only according to a unique frequency offset value. Therefore, a quantity of the at least one frequency offset value obtained by the processing module 12 is the same as a quantity of antenna terminals sending the at least one second signal, that is, the antenna terminal, the second signal, and the first frequency offset value are in a one-to-one correspondence with one another.

Step S402: Obtain the location information of the terminal device by means of calculation using a typical channel transmission model according to the at least one first frequency offset value and at least one piece of third location information, where the third location information is location information of an antenna terminal corresponding to one of the first frequency offset values.

In this embodiment, after the third location information of the antenna terminal corresponding to the second signal is obtained, the location information of the terminal device may be obtained by means of calculation by directly using the typical channel transmission model directly according to the at least one piece of location information and with reference to the at least one first frequency offset value, to implement accurate terminal device positioning.

Step S403: Obtain third location information of an antenna terminal corresponding to each first frequency offset value, obtain a third signal strength of a second signal on the antenna terminal corresponding to each first frequency offset value, and obtain the location information of the terminal device by means of calculation using a typical channel transmission model according to at least one piece of the third location information and at least one of the third signal strengths.

In this embodiment, during installation configuration of the base station, the base station pre-stores location information of a module that has a positioning function and that is integrated into antenna terminals corresponding to different frequency offset values, that is, location information of each antenna terminal is fixed. An energy value of each second signal is obtained by means of detection such that a signal strength of the second signal can be detected. Each second signal corresponds to one third signal strength, and the second signal, the third signal strength, and the third location information are also in a one-to-one correspondence with one another.

After the third signal strength of the second signal corresponding to the antenna terminal is obtained, the location information of the terminal device is obtained by means of calculation using the typical channel transmission model with reference to the third location information of the antenna terminal corresponding to the second signal, to implement accurate terminal device positioning.

The foregoing steps S402 and S403 are two parallel technical solutions after the first frequency offset value is obtained, and may be selected according to an actual situation in practical application. This is not limited in the present disclosure.

According to the terminal device positioning method provided in this embodiment, a frequency offset value of each second signal is obtained using received at least one second signal, and then a pre-stored correspondence between a frequency offset value and location information is queried, to obtain pieces of location information whose quantity is the same as a quantity of second signals. Location information of a terminal device is obtained using a typical channel transmission model according to the at least one frequency offset value and corresponding location information of at least one antenna terminal or according to location information of at least one antenna terminal and an obtained signal strength of a second signal corresponding to each location information. This does not depend on any action of the terminal device, requires no manual processing, and is not affected by an external environment. Therefore, terminal device positioning accuracy is effectively improved, and costs are reduced.

Figure 7:
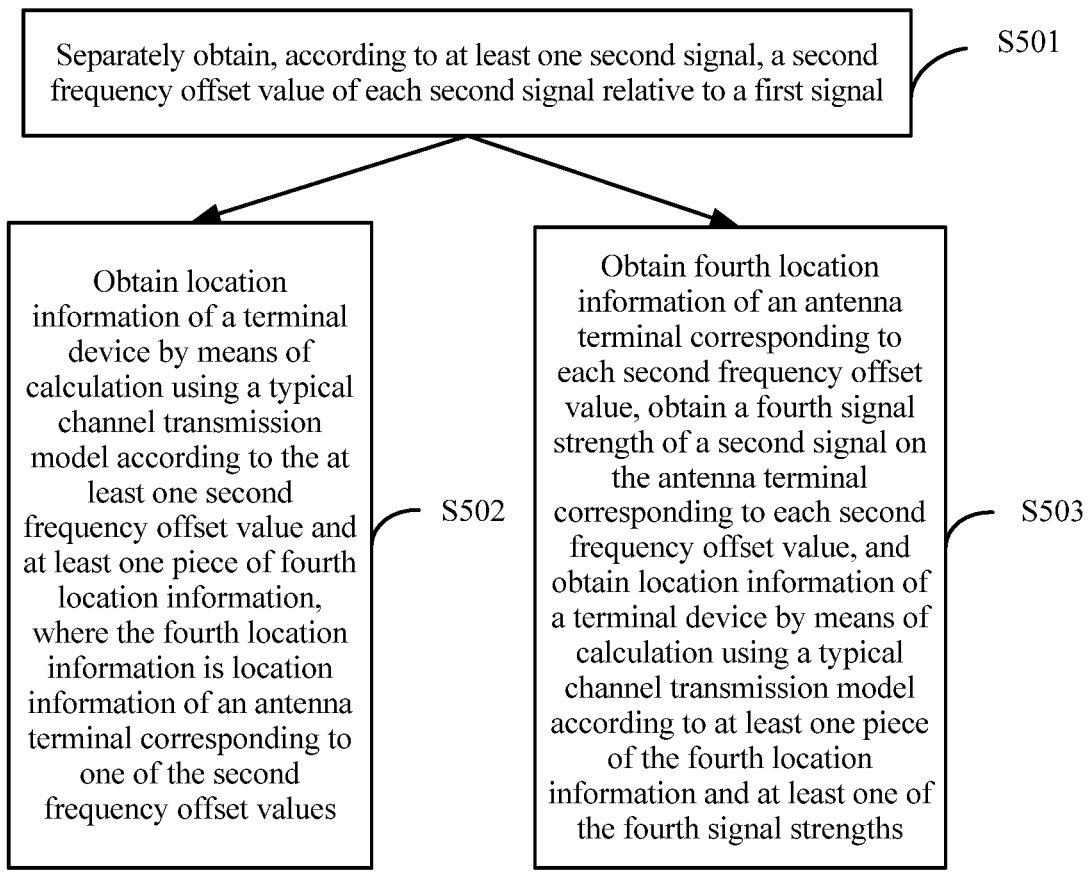
FIG. 7 is a flowchart of a fifth embodiment of a terminal device positioning method according to the present disclosure.

FIG. 7 is a flowchart of a fifth embodiment of a terminal device positioning method according to the present disclosure. As shown in FIG. 7, on a basis of the foregoing embodiment shown in FIG. 3, if a module with a frequency conversion processing function is integrated into an antenna terminal corresponding to the base station, there is an antenna terminal into which the module with a frequency conversion function is not integrated, and the base station receives the first signal and the at least one second signal, obtaining the location information of the terminal device by means of calculation according to the at least one second signal or according to the first signal and the at least one second signal in step S102 includes the following specific implementation steps.

Step S501: Separately obtain, according to the at least one second signal, a second frequency offset value of each second signal relative to the first signal.

In this embodiment, a feature different from an implementation manner of the foregoing solution shown in FIG. 6 is that a module with a frequency conversion function is not disposed in the antenna, that is, the base station receives the first signal on which frequency conversion processing is not performed. Therefore, when the second frequency offset value is obtained, a frequency at which the first signal is received may be used as a reference base to obtain a frequency offset of each second signal relative to the first signal received by the base station.

Step S502: Obtain the location information of the terminal device by means of calculation using a typical channel transmission model according to the at least one second frequency offset value and at least one piece of fourth location information, where the fourth location information is location information of an antenna terminal corresponding to one of the second frequency offset values.

In this embodiment, after the fourth location information of the antenna terminal corresponding to the second signal is obtained, the location information of the terminal device may be obtained by means of calculation by directly using the typical channel transmission model directly according to the at least one piece of location information and with reference to the at least one second frequency offset value, to implement accurate terminal device positioning.

Step S503: Obtain fourth location information of an antenna terminal corresponding to each second frequency offset value, obtain a fourth signal strength of a second signal on the antenna terminal corresponding to each second frequency offset value, and obtain the location information of the terminal device by means of calculation using a typical channel transmission model according to at least one piece of the fourth location information and at least one of the fourth signal strengths.

In this embodiment, after the at least one second frequency offset value is obtained, a processing manner is the same as the processing manner in the foregoing embodiment shown in FIG. 6, that is, a pre-stored correspondence between a frequency offset value and location information is queried to obtain the at least one piece of fourth location information in order to further determine the location information of the terminal device.

After the fourth signal strength of the second signal corresponding to the antenna terminal is obtained, the location information of the terminal device is obtained by means of calculation using the typical channel transmission model with reference to the fourth location information of the antenna terminal corresponding to the second signal, to implement accurate terminal device positioning.

The foregoing steps S502 and S503 are two parallel technical solutions after the second frequency offset value is obtained, and may be selected according to an actual situation in practical application. This is not limited in the present disclosure.

According to the terminal device positioning method provided in this embodiment, a frequency offset value of each second signal relative to a first signal is obtained using a received first signal and received at least one second signal, and then a pre-stored correspondence between a frequency offset value and location information is queried, to obtain pieces of location information whose quantity is the same as a quantity of second signals. Location information of a terminal device is obtained using a typical channel transmission model according to the at least one frequency offset value and corresponding location information of at least one antenna terminal or according to location information of at least one antenna terminal and an obtained signal strength of a second signal corresponding to each location information. This does not depend on any action of the terminal device, requires no manual processing, and is not affected by an external environment. Therefore, terminal device positioning accuracy is effectively improved, and costs are reduced.

Figure 8:
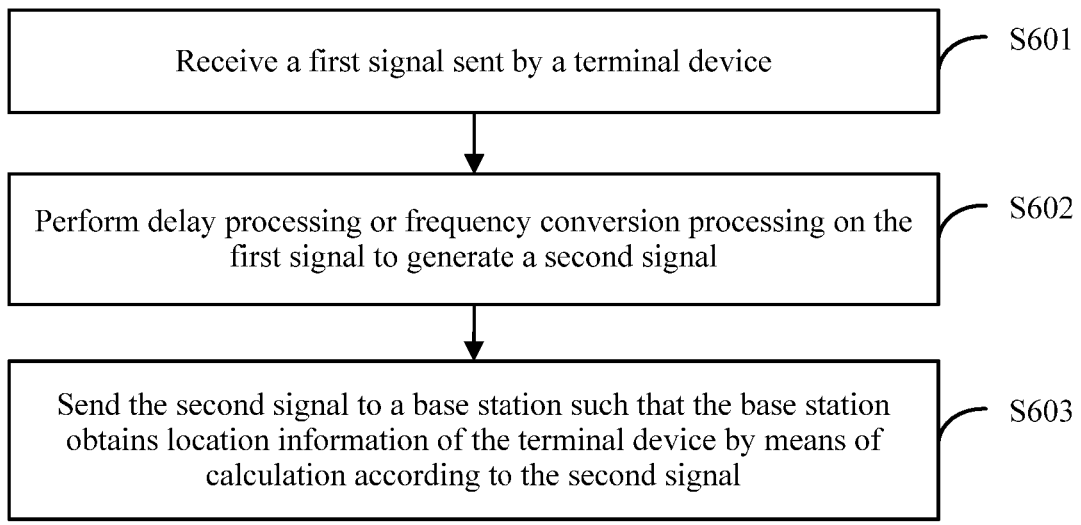
FIG. 8 is a flowchart of a sixth embodiment of a terminal device positioning method according to the present disclosure.

FIG. 8 is a flowchart of a sixth embodiment of a terminal device positioning method according to the present disclosure. As shown in FIG. 8, this embodiment is executed by an antenna terminal, and the terminal device positioning method includes the following specific implementation steps.

Step S601: Receive a first signal sent by a terminal device.

In this embodiment, the first signal includes a feedback signal sent by the terminal device to a base station according to a received downlink signal of the base station, also includes an uplink signal actively sent by the terminal device, and further includes another coupled signal.

Step S602: Perform delay processing or frequency conversion processing on the first signal to generate a second signal.

In this embodiment, a function module that can perform delay processing or frequency conversion processing is preset in the antenna terminal to process the first signal to generate the second signal. The second signal is in a one-to-one correspondence with the antenna terminal.

Step S603: Send the second signal to a base station such that the base station obtains location information of the terminal device by means of calculation according to the second signal.

According to the terminal device positioning method provided in this embodiment, a first signal of a terminal device is received, delay processing or frequency conversion processing is performed on the first signal, and a generated second signal is sent to a base station such that the base station obtains specific location information of a terminal device by means of calculation according to at least one second signal sent by at least one antenna terminal and according to a change of the signal. The specific location information of the terminal device is obtained using multiple second signals obtained after the delay processing or the frequency conversion processing. This is not affected by an external environment in comparison with unsteady channel information in order to effectively improve terminal device positioning accuracy.

On a basis of the foregoing embodiment, before the performing delay processing or frequency conversion processing on the first signal to generate a second signal in step S602, the method further includes performing power compensation processing on the first signal according to a preset gain, to obtain the first signal obtained after the compensation processing.

In this embodiment, a specific loss is generated due to signal transmission and processing. Therefore, method processing or compensation processing may be performed before the first signal is processed, and selection of an amplified gain mainly depends on an insertion loss of a delay device and an amplitude of a desired signal strength.

Particularly, power compensation processing is performed on a signal according to the preset gain, that is, compensation processing may be further separately performed on the second signal either before the delay processing or the frequency conversion processing or after the delay processing or the frequency conversion processing, or compensation processing may be performed separately on the first signal before the processing and the second signal after the processing such that the signal can achieve a desired strength.

Further, performing delay processing or frequency conversion processing on the first signal to generate a second signal in step S602 in the embodiment shown in FIG. 8 includes the following at least two specific implementation manners.

In a first possible implementation manner, delay processing is performed on the first signal according to a preconfigured delay offset value, to generate the second signal.

In this embodiment, a delay offset value of each antenna terminal is fixed, and one antenna terminal can generate only one second signal after performing delay processing on the first signal.

In a second possible implementation manner, filtering processing is performed on the first signal to obtain the first signal obtained after clutter filtering, and frequency conversion processing is performed, according to a preconfigured frequency offset value, on the first signal obtained after the clutter filtering, to generate the second signal.

In this embodiment, the first signal may include multiple signals an uplink signal and a coupled signal. Therefore, filtering processing needs to be performed before frequency conversion is performed, to obtain a first signal of a required frequency band, and the first signal is sent to the base station after the frequency conversion processing, and the base station can perform more accurate calculation.

According to the terminal device positioning method provided in this embodiment, delay processing or frequency conversion processing is performed on a first signal to obtain a second signal, and the second signal is sent to a base station such that the base station performs processing according to at least one second signal sent by at least one antenna terminal, obtains a delay offset value or a frequency offset value of each second signal, and obtains location information of a terminal device using a typical channel transmission model. Alternatively, a receiving module receives at least one second signal and a first signal, and a base station obtains a delay offset value or a frequency offset value of each second signal relative to the first signal, and obtains location information of a terminal device in a same manner. This does not depend on any action of the terminal device, requires no manual processing, and is not affected by an external environment. Therefore, terminal device positioning accuracy is effectively improved, and costs are reduced.

On a basis of the foregoing embodiments shown in FIG. 3 to FIG. 8, the following uses a specific example to describe the terminal device positioning method in the present disclosure in detail.

Figure 9:
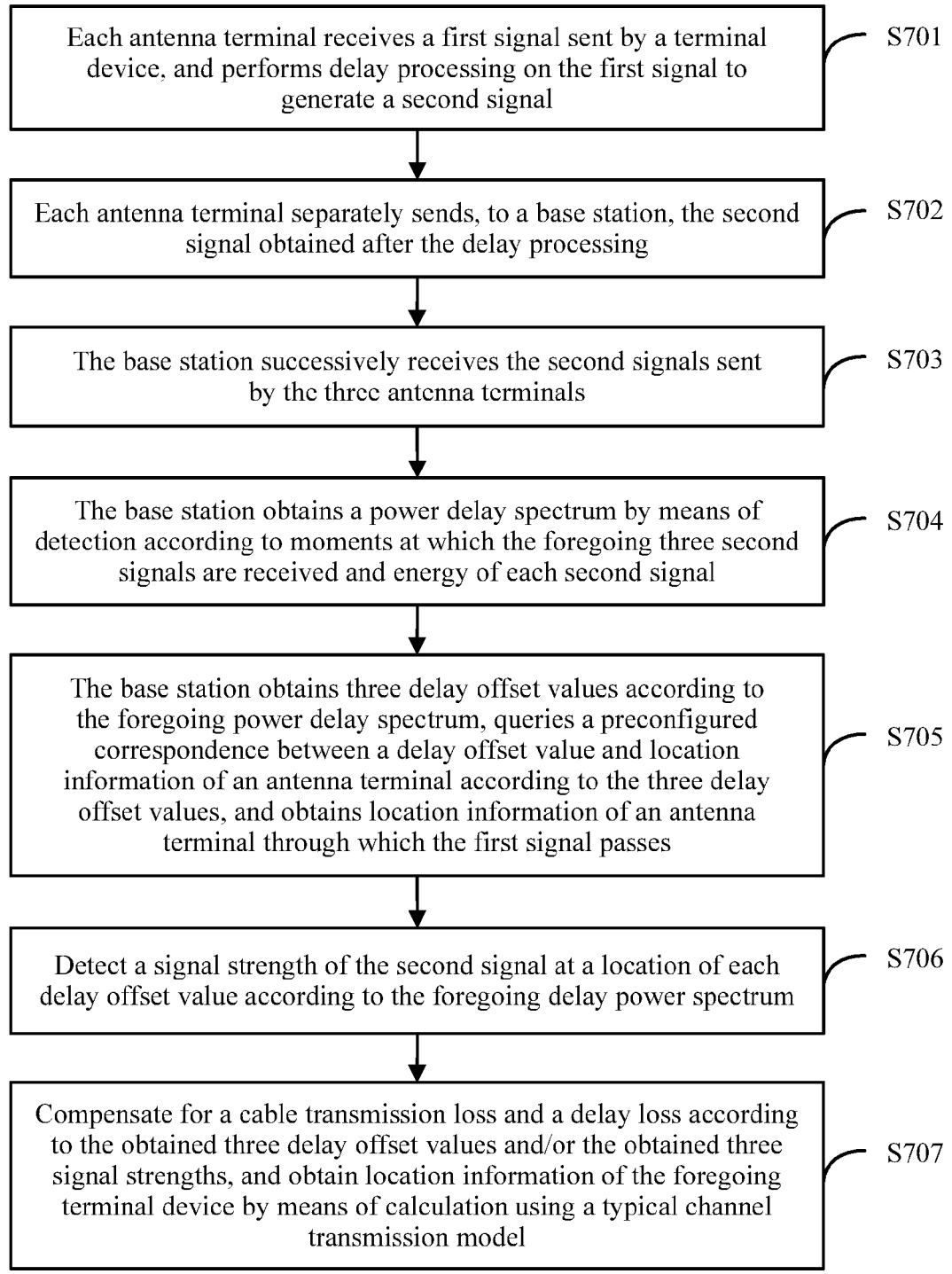
FIG. 9 is a flowchart of an example of a terminal device positioning method according to the present disclosure.

FIG. 9 is a flowchart of an example of a terminal device positioning method according to the present disclosure. In this embodiment, it is assumed that three antenna terminals are preinstalled in a building, a function module that can perform delay processing is integrated into each antenna terminal to implement delay processing, delay offset values preconfigured for the antenna terminals are separately 100 nanoseconds (ns), 200 ns, and 300 ns, and location information about an installation location of each antenna terminal is pre-stored in a base station. A method for positioning a terminal device in the building includes the following specific implementation steps.

Step S701: Each antenna terminal receives a first signal sent by a terminal device, and performs delay processing on the first signal to generate a second signal.

In this embodiment, each antenna terminal generates one second signal. In comparison with moments at which the second signals are directly sent to the base station, the second signals are sent to the base station separately after the delays of 100 ns, 200 ns, and 300 ns.

Step S702: Each antenna terminal separately sends, to a base station, the second signal obtained after the delay processing.

Step S703: The base station successively receives the second signals sent by the three antenna terminals.

Step S704: The base station obtains a power delay spectrum by means of detection according to moments at which the foregoing three second signals are received and energy of each second signal.

Figure 10:
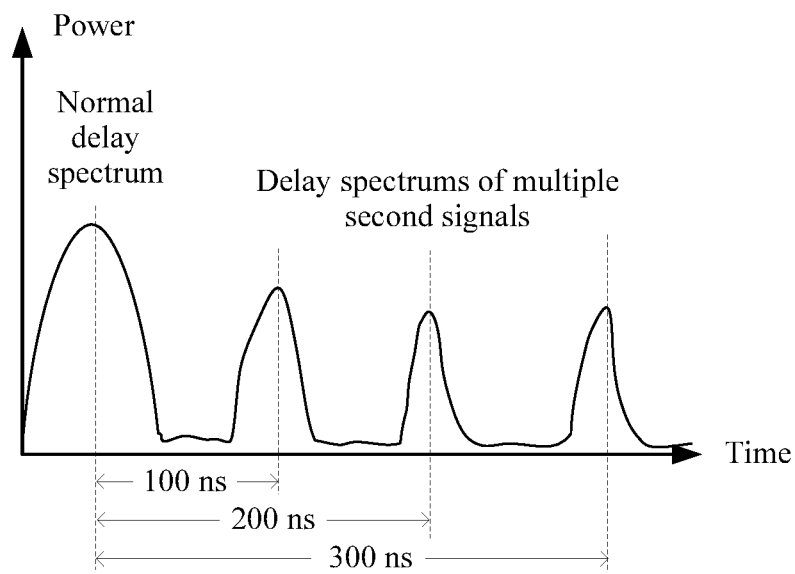
FIG. 10 is a schematic diagram of a power delay spectrum in an example of a terminal device positioning method according to the present disclosure.

In this embodiment, for a typical power delay spectrum, a horizontal axis represents time, and a longitudinal axis represents energy (power) of a received signal. FIG. 10 is a schematic diagram of a power delay spectrum in an example of a terminal device positioning method according to the present disclosure. As shown in FIG. 10, in the power delay spectrum constructed in this embodiment, a first peak represents a delay spectrum when delay processing is not performed on an uplink signal. Generally, when a downlink signal of the base station is received, a delay spread of an uplink signal transmitted by the terminal device is less than 225 ns. For the second signals sent by the antenna terminals, the delays of 100 ns, 200 ns, and 300 ns are generated relative to a normal delay.

Particularly, modules with a positioning function are connected using a cable. Therefore, transmission delays of different time lengths occur. Compensation may be performed when processing is performed.

Step S705: The base station obtains three delay offset values according to the foregoing power delay spectrum, queries a preconfigured correspondence between a delay offset value and location information of an antenna terminal according to the three delay offset values, and obtains location information of an antenna terminal through which the first signal passes.

In this embodiment, positioning may be performed on the terminal device by directly using an existing calculation model directly according to the three delay offset values and location information of the three antenna terminals corresponding to the three delay offset values.

Step S706: Detect a signal strength of the second signal at a location of each delay offset value according to the foregoing power delay spectrum.

Step S707: Compensate for a cable transmission loss and a delay loss according to the obtained three delay offset values and/or the obtained three signal strengths, and obtain location information of the foregoing terminal device by means of calculation using a typical channel transmission model.

In this embodiment, the base station may perform positioning on the terminal device as long as at least one antenna terminal performs delay processing on the first signal. However, to implement more accurate positioning, antenna terminals at three or more locations are generally used to perform delay processing, and then multi-point positioning is performed to determine a location of the terminal device.

According to the terminal device positioning method provided in this embodiment, three antenna terminals with a delay processing function are preset to perform delay processing on an uplink signal of a terminal device to generate three second signals, and the three second signals generate delay offset values of different times. The antenna terminals separately send the second signals to a base station such that the base station constructs a power delay spectrum with reference to energy and a delay offset value of each second signal, to obtain the three delay offset values and corresponding signal strengths of location information, thereby implementing terminal device positioning. The whole process does not depend on an individual action of the terminal device, requires no manual involvement, and is not greatly affected by a change of a surrounding environment. Therefore, terminal device positioning accuracy and reliability are effectively improved, and costs are reduced.

Figure 11A:
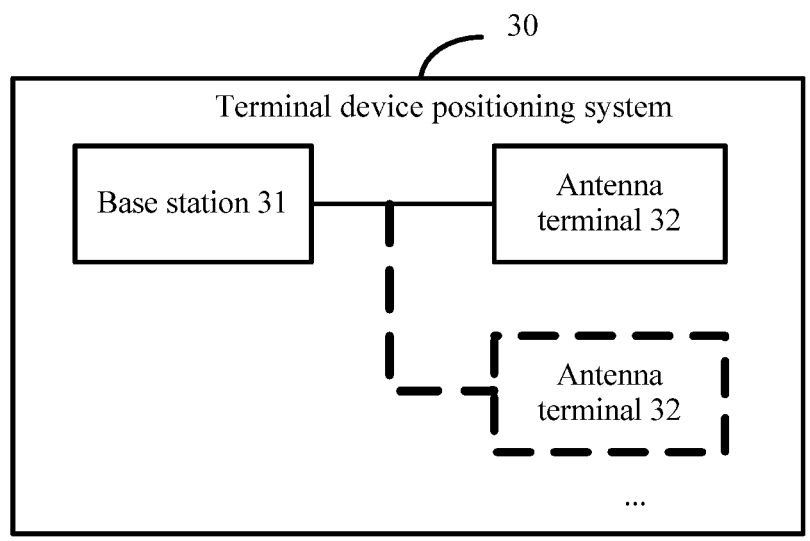
FIG. 11A is a schematic structural diagram of a first embodiment of a terminal device positioning system according to the present disclosure.

FIG. 11A is a schematic structural diagram of a first embodiment of a terminal device positioning system 30 according to the present disclosure. The system may be applied to resolve an indoor positioning problem, and is an improved system of a DAS system used inside a building. As shown in FIG. 11A, the terminal device positioning system 30 includes a base station 31 and at least one antenna terminal 32. Each antenna terminal 32 is configured to receive a first signal sent by a terminal device, perform delay processing or frequency conversion processing on the first signal to generate a second signal, and send the second signal to the base station 31. The base station 31 is configured to receive at least one second signal, or receive a first signal and at least one second signal, and obtain location information of the terminal device by means of calculation according to the at least one second signal or according to the first signal and the at least one second signal. The first signal is sent by the terminal device to an antenna terminal, and the at least one second signal is generated after each antenna terminal in at least one antenna terminal performs delay processing or frequency conversion processing on the first signal.

Figure 11B:
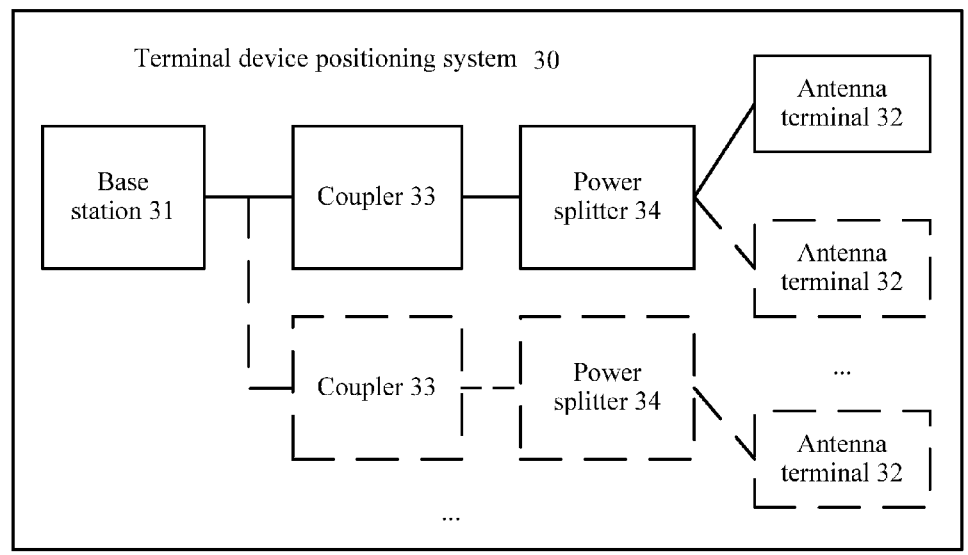
FIG. 11B is a schematic diagram of an installation example of a first embodiment of a terminal device positioning system according to the present disclosure.

In this embodiment, further, FIG. 11B is a schematic diagram of an installation example of a first embodiment of a terminal device positioning system 30 according to the present disclosure. As shown in FIG. 11B, generally, floors of a building are connected to each other using a coupler 33, and the at least one antenna terminal 32 is installed after a power splitter 34 configured for each floor. A dashed-line part in the figure indicates that an installation manner used when there is only one floor is applicable to each floor when there is a relatively large quantity of floors. Although positioning may be performed on a terminal device as long as one antenna terminal 32 exists on each floor, in an example, three or more antenna terminals 32 are usually selected to implement terminal device positioning. In addition, the antenna terminal 32 in this system is different from an antenna in other approaches. A delay processing or frequency conversion processing function is added to the antenna terminal 32 in comparison with the antenna in other approaches such that the antenna terminal 32 can perform delay processing or frequency conversion processing on the first signal. Therefore, the base station 31 performs accurate positioning on the terminal device according to a processed signal.

Particularly, the antenna terminals 32 in the present disclosure may be connected using a cable, and may further be connected in a wireless coupling manner.

The first signal in this embodiment is sent by the terminal device to the antenna terminal 32. The at least one second signal is generated after each antenna terminal 32 in at least one antenna terminal performs delay processing or frequency conversion processing on the first signal. Each second signal corresponds to one antenna terminal 32.

According to the terminal device positioning system 30 provided in the present disclosure, positioning is performed on a terminal device in the foregoing manner for multiple times. A channel library is automatically established in a base station 31. Comprehensive positioning may be further performed on the terminal device with reference to a manner of a channel library in other approaches in order to perform mutual correction. This improves positioning reliability.

According to the terminal device positioning system 30 provided in this embodiment, the base station 31 receives at least one second signal generated after at least one antenna terminal 32 performs delay processing or frequency conversion processing on a first signal sent by a terminal device. The base station 31 obtains specific location information of the terminal device by means of calculation according to the processed at least one second signal and according to a change of the signal. The specific location information of the terminal device is obtained using multiple second signals obtained after the delay processing or the frequency conversion processing. This is not affected by an external environment in comparison with unsteady channel information in order to effectively improve terminal device positioning accuracy.

Figure 12A:
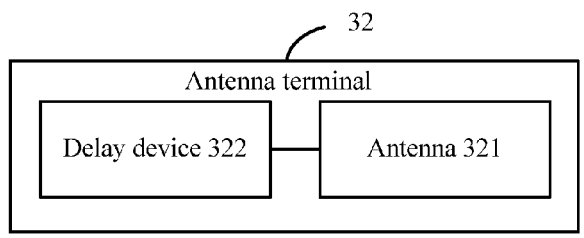
FIG. 12A is a schematic structural diagram of an antenna terminal in an embodiment of a terminal device positioning system according to the present disclosure.

FIG. 12A is a schematic structural diagram of an antenna terminal 32 in an embodiment of a terminal device positioning system according to the present disclosure. As shown in FIG. 12A, on a basis of the foregoing embodiment, each antenna terminal 32 includes an antenna 321 and a delay device 322. The delay device 322 is configured to perform delay processing on the first signal according to a preconfigured delay offset value, to generate the second signal.

In this embodiment, in an original DAS system, the delay device 322 is deployed after the antenna 321 to form the antenna terminal 32 with a delay function. The delay device 322 sufficiently delays an input signal. The delay device 322 may be a passive device. That is, a signal is delayed in a passive manner, or the signal may be delayed and adjusted in an active manner.

An installation manner of the delay device 322 may be to add a coupling unit (not shown) into an original system to connect the delay device 322 and individually connect an antenna, such as the antenna 321, or may be to add a coupling unit into an original system to connect the delay device 322 and then to connect the original system using the coupling unit, or may be to directly connect an original system as shown in FIG. 12A.

An installation location of the delay device 322 is determined according to positioning estimation. Generally, each floor has at least three delay devices 322. A delay time of the delay device 322 is determined according to an indoor transmission environment, and is generally over 225 ns. The delay devices 322 on a same floor are required to at least have different delay times. A delay interval is determined according to a signal bandwidth, and is generally not less than 32 ns. The base station (not shown) detects all uplink signals, including the foregoing delayed signal, obtains, by means of query, the installation location of the delay device 322 according to a location, with respect to time, and energy of the delayed signal, and calculates a location of the terminal device.

Figure 12B:
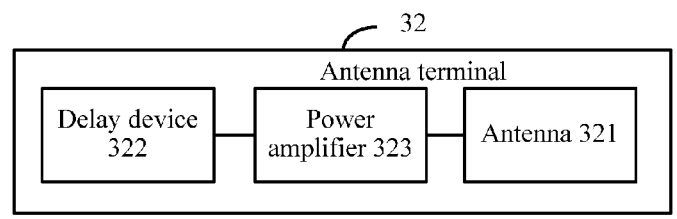
FIG. 12B is a schematic structural diagram of another antenna terminal in an embodiment of a terminal device positioning system according to the present disclosure.

FIG. 12B is a schematic structural diagram of another antenna terminal 32 in an embodiment of a terminal device positioning system according to the present disclosure. With respect to the FIG. 12B, each antenna terminal 32 further includes a power amplifier 323. The power amplifier 323 is configured to perform power compensation processing on the first signal according to a preset gain, to obtain the first signal obtained after the compensation processing, and before the delay device 322 performs delay processing on the first signal according to the preconfigured delay offset value, to generate the second signal.

In this embodiment, in addition to the foregoing structure of the antenna terminal in FIG. 12A, the power amplifier 323 is further included. The first signal may be amplified using the power amplifier 323, and then be processed by the delay device 322. The power amplifier 323 is an active device, and needs to be supplied with power by a direct-current power. A gain of the power amplifier 323 depends on an insertion loss of the delay device 322 and a desired signal strength, and may be selected according to an actual situation.

In this embodiment, if the structure of the antenna terminal 32 is shown in FIG. 12A or 12B, the base station (not shown) is further configured to separately obtain, according to the at least one second signal, a first delay offset value corresponding to each second signal, and obtain the location information of the terminal device by means of calculation using a typical channel transmission model according to the at least one first delay offset value and at least one piece of first location information, where the first location information is location information of an antenna terminal 32 corresponding to one of the first delay offset values, or obtain first location information of an antenna terminal 32 corresponding to each first delay offset value, obtain a first signal strength of a second signal on the antenna terminal 32 corresponding to each first delay offset value, and obtain the location information of the terminal device by means of calculation using a typical channel transmission model according to at least one piece of the first location information and at least one of the first signal strengths.

Figure 12C:
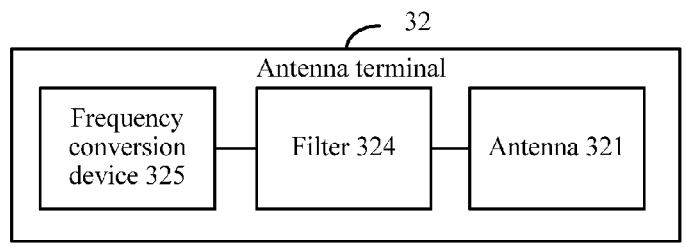
FIG. 12C is a schematic structural diagram of still another antenna terminal in an embodiment of a terminal device positioning system according to the present disclosure.

FIG. 12C is a schematic structural diagram of still another antenna terminal 32 in an embodiment of a terminal device positioning system according to the present disclosure. As shown in FIG. 12C, on a basis of the foregoing embodiment, each antenna terminal 32 includes an antenna 321, a filter 324, and a frequency conversion device 325. The filter 324 is configured to perform filtering processing on the first signal to obtain the first signal obtained after clutter filtering. The frequency conversion device 325 is configured to perform, according to a preconfigured frequency offset value, frequency conversion processing on the first signal obtained after the clutter filtering, to generate the second signal.

A difference between this embodiment and FIG. 12A is use of a frequency conversion solution. That is, a frequency of the first signal received by the antenna 321 is selected, and then the frequency conversion device 325 performs frequency conversion processing on a first signal of a proper frequency, to obtain the second signal. The frequency conversion device 325 may be implemented using a component such as a duplexer or a multiplexer.

Figure 12D:
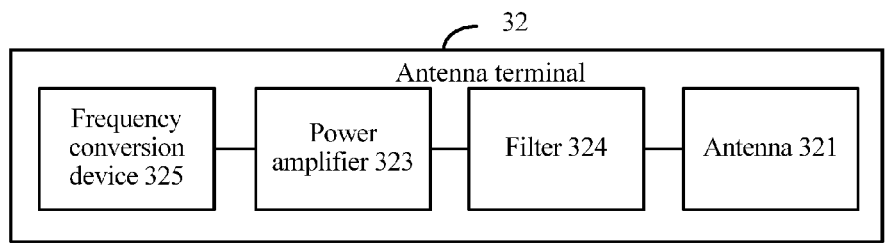
FIG. 12D is a schematic structural diagram of yet another antenna terminal in an embodiment of a terminal device positioning system according to the present disclosure.

FIG. 12D is a schematic structural diagram of yet another antenna terminal 32 in an embodiment of a terminal device positioning system according to the present disclosure. As shown in FIG. 12D, on a basis of the foregoing embodiment, each antenna terminal 32 further includes a power amplifier 323. The power amplifier 323 is configured to perform power compensation processing on the first signal according to the preset gain to obtain the first signal obtained after the compensation processing before the frequency conversion device 325 performs, according to a preconfigured frequency offset value, frequency conversion processing on the first signal obtained after clutter filtering, to generate the second signal.

In addition to the foregoing structure of the antenna terminal in FIG. 12C, the power amplifier 323 is further included in FIG. 12D. After the filter 324 performs filtering on the first signal to select a proper frequency, the power amplifier 323 amplifies the first signal, and then the frequency conversion device 325 processes the first signal. The power amplifier 323 is an active device, and needs to be supplied with power by a direct-current power. A gain of the power amplifier 323 depends on an insertion loss of the delay device and a desired signal strength, and may be selected according to an actual situation.

In this embodiment, if the structure of the antenna terminal is shown in FIG. 12C or 12D, the base station (not shown) is further configured to separately obtain, according to the at least one second signal, a first delay offset value corresponding to each second signal, and obtain the location information of the terminal device by means of calculation using a typical channel transmission model according to the at least one first frequency offset value and at least one piece of third location information, where the third location information is location information of an antenna terminal 32 corresponding to one of the first frequency offset values, or obtain third location information of an antenna terminal 32 corresponding to each first frequency offset value, obtain a third signal strength of a second signal on the antenna terminal 32 corresponding to each first frequency offset value, and obtain the location information of the terminal device by means of calculation using a typical channel transmission model according to at least one piece of the third location information and at least one of the third signal strengths.

Figure 13:
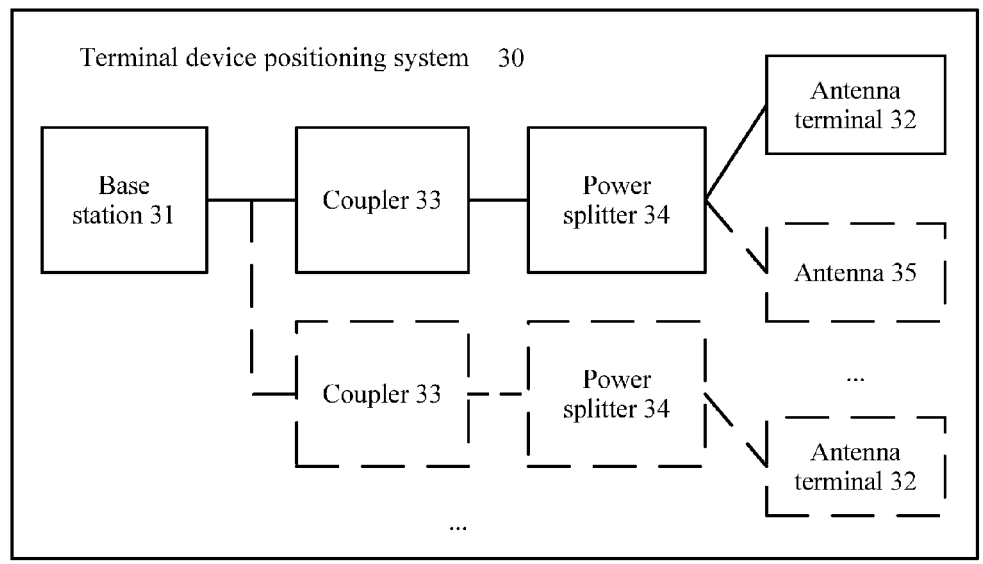
FIG. 13 is a schematic structural diagram of a second embodiment of a terminal device positioning system according to the present disclosure.

FIG. 13 is a schematic structural diagram of a second embodiment of a terminal device positioning system 30 according to the present disclosure. As shown in FIG. 13, on a basis of any one of the foregoing embodiments of the terminal device positioning system 30, the terminal device positioning system 30 further includes an antenna 35. The antenna 35 is configured to receive the first signal sent by a user terminal, and send the first signal to the base station 31.

In this embodiment, as shown in FIG. 13, another application scenario is provided. An antenna 35 and at least one antenna terminal 32 may be further included after a power splitter 34 and a coupler 33 on a same floor. After receiving the first signal, the antenna 35 directly sends the first signal to the base station 31 such that when the base station 31 processes a received second signal sent by the antenna terminal 32, the base station 31 may use the first signal as a basis to obtain a delay offset value and a frequency offset value. Therefore, positioning is more accurately performed on a location of the terminal device.

In this embodiment, if the antenna terminal 32 includes a delay device (not shown), the base station 31 is further configured to separately obtain, according to the at least one second signal, a second delay offset value of each second signal relative to the first signal, and obtain the location information of the terminal device by means of calculation using a typical channel transmission model according to the at least one second delay offset value and at least one piece of second location information, where the second location information is location information of an antenna terminal 32 corresponding to one of the second delay offset values, or obtain second location information of an antenna terminal 32 corresponding to each second delay offset value, obtain a second signal strength of a second signal on the antenna terminal 32 corresponding to each second delay offset value, and obtain the location information of the terminal device by means of calculation using a typical channel transmission model according to at least one piece of the second location information and at least one of the second signal strengths.

Optionally, if the antenna terminal 32 includes a frequency conversion device (not shown), the base station 31 is further configured to separately obtain, according to the at least one second signal, a second frequency offset value of each second signal relative to the first signal, and obtain the location information of the terminal device by means of calculation using a typical channel transmission model according to the at least one second frequency offset value and at least one piece of fourth location information, where the fourth location information is location information of an antenna terminal 32 corresponding to one of the second frequency offset values, or obtain fourth location information of an antenna terminal 32 corresponding to each second frequency offset value, obtain a fourth signal strength of a second signal on the antenna terminal 32 corresponding to each second frequency offset value, and obtain the location information of the terminal device by means of calculation using a typical channel transmission model according to at least one piece of the fourth location information and at least one of the fourth signal strengths.

Figure 14:
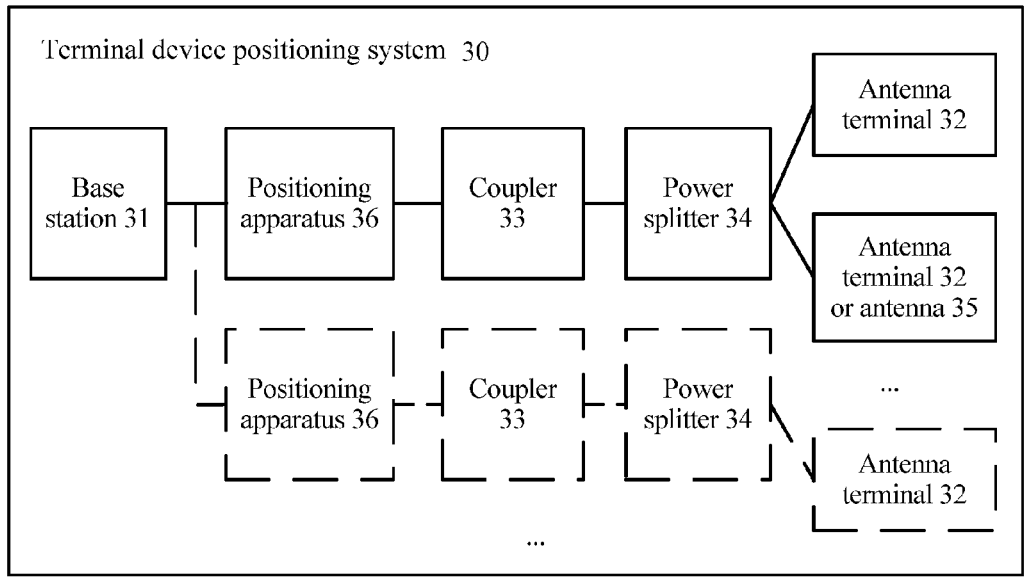
FIG. 14 is a schematic structural diagram of a third embodiment of a terminal device positioning system according to the present disclosure.

FIG. 14 is a schematic structural diagram of a fourth embodiment of a terminal device positioning system 30 for a terminal device. As shown in FIG. 14, on a basis of any one of the foregoing embodiments of the terminal device positioning system 30, the terminal device positioning system 30 further includes at least one positioning apparatus 36. The positioning apparatus 36 is configured to perform delay processing or frequency conversion processing on the at least one second signal.

In this embodiment, as shown in FIG. 14, still another application scenario is provided. When there is a relatively large quantity of floors in a to-be-positioned building, to better perform positioning on the terminal device, a shared positioning apparatus 36 may be further installed on each floor after each antenna terminal 32 performs delay processing or frequency conversion processing. The positioning apparatus 36 may be installed at a location shown in FIG. 14. Delay is uniformly performed on a second signal on each floor (an extra signal loss needs to be compensated for). Generally, a delay time of the first signal is set to a three-digit number less than 1000 ns in a delay device integrated into the antenna terminal. A longer delay time may be set in the positioning apparatus 36, for example, 1000 ns, 2000 ns, and 3000 ns. In addition, a floor corresponding to a thousand-digit delay is stored in a base station such that, after the base station 31 receives the second signal on which delay processing is performed twice, the base station 31 can determine, according to a thousand digit of the obtained delay offset value, a floor on which the terminal device is located, and obtain a specific location of the antenna terminal 32 according to a hundred digit of the delay offset value, to perform further positioning on the terminal device.

In a calculation process, a delay and an energy loss difference that are caused by a cable connection are compensated for to obtain more accurate location information. In this process, a multi-antenna manner may be also introduced to perform spatial detection in combination with the method in the foregoing, to obtain a more accurate user location.

The positioning apparatus 36 may also perform frequency conversion processing again, and a specific implementation principle of the frequency conversion processing is the same as that of the delay processing. The positioning apparatus 36 may be installed in a bus of all second signals on any floor in order to process all the second signals again. This improves positioning accuracy.

In all the foregoing embodiments of the terminal device positioning system 30, a coupler 33 and a power splitter 34 are not devices that must be installed, and may be selected according to an actual need. This is not limited in the present disclosure.

According to the terminal device positioning system 30 provided in this embodiment, a delay device or a frequency conversion device included in an antenna terminal 32 processes a first signal to generate a second signal, and sends the second signal to a base station 31. The base station 31 receives at least one second signal sent by at least one antenna terminal 32, and the base station 31 obtains specific location information of a terminal device by means of calculation according to the processed at least one second signal and according to a change of the signal. The specific location information of the terminal device is obtained using multiple second signals obtained after delay processing or frequency conversion processing. This is not affected by an external environment in comparison with unsteady channel information in order to effectively improve terminal device positioning accuracy and reliability. In addition, the whole positioning process does not depend on an action of the terminal device. Therefore, costs are reduced.

Figure 15:
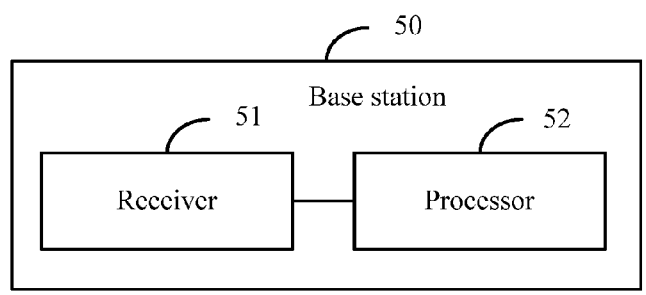
FIG. 15 is a schematic structural diagram of a second embodiment of a base station according to the present disclosure.

FIG. 15 is a schematic structural diagram of a second embodiment of a base station 50 according to the present disclosure. The base station 50 includes a receiver 51 and a processor 52. The receiver 51 is configured to receive at least one second signal, or receive a first signal and at least one second signal. The first signal is sent by a terminal device to an antenna terminal. The at least one second signal is generated after each antenna terminal in at least one antenna terminal performs delay processing or frequency conversion processing on the first signal. The processor 52 is configured to obtain location information of the terminal device by means of calculation according to the at least one second signal or according to the first signal and the at least one second signal.

The base station 50 provided in this embodiment is configured to perform the technical solutions in the method embodiments. Implementation principles and technical effects of the base station 50 are similar. The receiver 51 receives at least one second signal generated after at least one antenna terminal performs delay processing or frequency conversion processing on a first signal sent by a terminal device. The processor 52 obtains specific location information of the terminal device by means of calculation according to the processed at least one second signal and according to a change of the signal. The specific location information of the terminal device is obtained using multiple second signals obtained after the delay processing or the frequency conversion processing. This is not affected by an external environment in comparison with unsteady channel information. Therefore, terminal device positioning accuracy is effectively improved.

On a basis of the foregoing embodiment, if the receiver 51 receives only the at least one second signal, the processor 52 is configured to separately obtain, according to the at least one second signal, a first delay offset value corresponding to each second signal, and obtain the location information of the terminal device by means of calculation using a typical channel transmission model according to the at least one first delay offset value and at least one piece of first location information, where the first location information is location information of an antenna terminal corresponding to one of the first delay offset values, or obtain first location information of an antenna terminal corresponding to each first delay offset value, obtain a first signal strength of a second signal on the antenna terminal corresponding to each first delay offset value, and obtain the location information of the terminal device by means of calculation using a typical channel transmission model according to at least one piece of the first location information and at least one of the first signal strengths.

Optionally, if the receiver 51 receives the first signal and the at least one second signal, the processor 52 is further configured to separately obtain, according to the at least one second signal, a second delay offset value of each second signal relative to the first signal, and obtain the location information of the terminal device by means of calculation using a typical channel transmission model according to the at least one second delay offset value and at least one piece of second location information, where the second location information is location information of an antenna terminal corresponding to one of the second delay offset values, or obtain second location information of an antenna terminal corresponding to each second delay offset value, obtain a second signal strength of a second signal on the antenna terminal corresponding to each second delay offset value, and obtain the location information of the terminal device by means of calculation using a typical channel transmission model according to at least one piece of the second location information and at least one of the second signal strengths.

Optionally, if the receiver 51 receives only the at least one second signal, the processor 52 is configured to separately obtain, according to the at least one second signal, a first frequency offset value corresponding to each second signal, and obtain the location information of the terminal device by means of calculation using a typical channel transmission model according to the at least one first frequency offset value and at least one piece of third location information, where the third location information is location information of an antenna terminal corresponding to one of the first frequency offset values, or obtain third location information of an antenna terminal corresponding to each first frequency offset value, obtain a third signal strength of a second signal on the antenna terminal corresponding to each first frequency offset value, and obtain the location information of the terminal device by means of calculation using a typical channel transmission model according to at least one piece of the third location information and at least one of the third signal strengths.

Optionally, if the receiver 51 receives the first signal and the at least one second signal, the processor 52 is configured to separately obtain, according to the at least one second signal, a second frequency offset value of each second signal relative to the first signal, and obtain the location information of the terminal device by means of calculation using a typical channel transmission model according to the at least one second frequency offset value and at least one piece of fourth location information, where the fourth location information is location information of an antenna terminal corresponding to one of the second frequency offset values, or obtain fourth location information of an antenna terminal corresponding to each second frequency offset value, obtain a fourth signal strength of a second signal on the antenna terminal corresponding to each second frequency offset value, and obtain the location information of the terminal device by means of calculation using a typical channel transmission model according to at least one piece of the fourth location information and at least one of the fourth signal strengths.

The base station provided in this embodiment is configured to perform any technical solution in the method embodiments. Implementation principles and technical effects of the base station are similar. Details are not described herein again.

Figure 16:
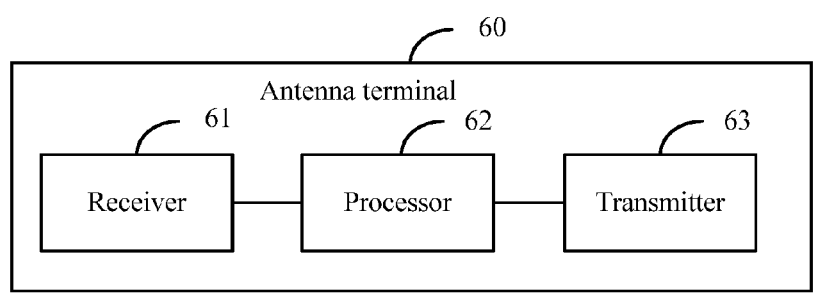
FIG. 16 is a schematic structural diagram of a second embodiment of an antenna terminal according to the present disclosure.

FIG. 16 is a schematic structural diagram of a second embodiment of an antenna terminal 60 according to the present disclosure. As shown in FIG. 16, the antenna terminal 60 includes a receiver 61, a processor 62, and a transmitter 63. The receiver 61 is configured to receive a first signal sent by a terminal device. The processor 62 is configured to perform delay processing or frequency conversion processing on the first signal to generate a second signal. The transmitter 63 is configured to send the second signal to a base station such that the base station obtains location information of the terminal device by means of calculation according to the second signal.

The antenna terminal 60 provided in this embodiment is configured to perform the technical solutions in the method embodiments. Implementation principles and technical effects of the antenna terminal 60 are similar. The receiver 61 receives a first signal sent by a terminal device. The processor 62 performs delay processing or frequency conversion processing on the first signal. The transmitter 63 sends a generated second signal to a base station. Therefore, the base station obtains specific location information of the terminal device by means of calculation according to at least one second signal sent by at least one antenna terminal 60 and according to a change of the signal. The specific location information of the terminal device is obtained using multiple second signals obtained after the delay processing or the frequency conversion processing. This is not affected by an external environment in comparison with unsteady channel information. Therefore, terminal device positioning accuracy is effectively improved.

On a basis of the foregoing embodiment, before performing delay processing or frequency conversion processing on the first signal to generate the second signal, the processor 62 is further configured to perform power compensation processing on the first signal according to a preset gain, to obtain the first signal obtained after the compensation processing.

Optionally, the processor 62 is further configured to perform delay processing on the first signal according to a preconfigured delay offset value to generate the second signal, or perform filtering processing on the first signal to obtain the first signal obtained after clutter filtering, and perform, according to a preconfigured frequency offset value, frequency conversion processing on the first signal obtained after the clutter filtering, to generate the second signal.

The antenna terminal 60 provided in this embodiment is configured to perform any technical solution in the method embodiments. Implementation principles and technical effects of the antenna terminal 60 are similar. Details are not described herein again.

Further, in the second embodiment of the foregoing base station and the second embodiment of the antenna terminal. It should be understood that, the processor may be a central processing unit (CPU), or the processor may be another general purpose processor, a digital signal processor (DSP), an application specific integrated circuit (ASIC), a field-programmable gate array (FPGA) or another programmable logic device, a discrete gate or transistor logic device, a discrete hardware assembly, or the like. The general-purpose processor may be a microprocessor, or the processor may further be any conventional processor, or the like. The steps of the method disclosed with reference to the embodiments of the present disclosure may be directly performed by a hardware processor, or may be performed using a combination of hardware in the processor and a software module. A software module may be located in a mature storage medium in the art, such as a random access memory (RAM), a flash memory, a read-only memory (ROM), a programmable read-only memory (PROM), an electrically erasable programmable read-only memory (EEPROM), a register, or the like. The storage medium is located in the memory, and a processor reads information in the memory and completes the steps in the foregoing methods in combination with hardware of the processor.

A person of ordinary skill in the art may understand that all or some of the steps of the method embodiments may be implemented by a program instructing relevant hardware. The program may be stored in a computer readable storage medium. The steps of the method embodiments are performed when the program runs. The foregoing storage medium includes any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A base station, comprising:
   a receiver configured to receive at least one second signal from at least one antenna terminal, a corresponding second signal of each antenna terminal being a signal obtained after delay processing or frequency conversion processing of the first signal by each of the antenna terminals;
   a processor coupled to the receiver and configured to:
   obtain, according to the at least one second signal, a first delay offset value of the corresponding second signal of each of the antenna terminals;
   either obtain location information of the terminal device by-using a channel transmission model according to at least one first delay offset value and at least one piece of first location information, the first location information being location information of an antenna terminal corresponding to the first delay offset value; or
   obtain first location information of an antenna terminal corresponding to each first delay offset value, obtain a first signal strength of the corresponding second-signal on the antenna terminal corresponding to the each first delay offset value, and obtain the location information of the terminal device by using the channel transmission model according to the at least one piece of first location information and at least one of first signal strengths; and
   a memory coupled to the receiver and the processor, the memory configured to pre-store location information of each of the antenna terminals corresponding to different frequency offset values of the corresponding second signal of each of the antenna terminals.

2. The base station of claim 1, wherein the receiver receives the first signal and the at least one second signal, the processor being further configured to:

obtain, according to the at least one second signal, a second delay offset value of the corresponding second signal of each of the antenna terminals relative to the first signal; and either obtain the location information of the terminal device by using a channel transmission model according to at least one second delay offset value and at least one piece of second location information, the second location information being location information of an antenna terminal corresponding to a second delay offset value, or obtain second location information of an antenna terminal corresponding to each second delay offset value, obtain a second signal strength of a second signal on the antenna terminal corresponding to each second delay offset value, and obtain the location information of the terminal device by using the channel transmission model according to the at least one piece of second location information and at least one of second signal strengths.

3. The base station of claim 1, wherein the receiver receives only the at least one second signal, the processor being further configured to:

obtain, according to the at least one second signal, a first frequency offset value of the corresponding second signal of each of the antenna terminals; and either obtain the location information of the terminal device by using a channel transmission model according to at least one first frequency offset value and at least one piece of third location information, the third location information being location information of an antenna terminal corresponding to a first frequency offset value, or obtain third location information of an antenna terminal corresponding to each first frequency offset value, obtain a third signal strength of the corresponding second signal on the antenna terminal corresponding to each first frequency offset value, and obtain the location information of the terminal device by using the channel transmission model according to the at least one piece of third location information and at least one of third signal strengths.

4. The base station of claim 1, wherein the receiver receives the first signal and the at least one second signal, the processor being configured to:

obtain, according to the at least one second signal, a second frequency offset value of the corresponding second signal of each of the antenna terminals relative to the first signal; and either obtain the location information of the terminal device by using a channel transmission model according to at least one second frequency offset value and at least one piece of fourth location information, the fourth location information being location information of an antenna terminal corresponding to a second frequency offset value, or obtain fourth location information of an antenna terminal corresponding to each second frequency offset value, obtain a fourth signal strength of the corresponding second signal of each of the antenna terminals corresponding to each second frequency offset value, and obtain the location information of the terminal device by using the channel transmission model according to the at least one piece of fourth location information and at least one of fourth signal strengths.

5. A terminal device positioning method, comprising:

receiving, by a base station, at least one second signal from at least one antenna terminal, a corresponding second signal of each antenna terminal being a signal obtained after delay processing or frequency conversion processing of the first signal by each of the antenna terminals;

obtaining, according to the at least one second signal, a first delay offset value of the corresponding second signal of each of the antenna terminals; and either obtaining, by the base station, location information of the terminal device by using a channel transmission model according to at least one first delay offset value and at least one piece of first location information, the first location information being location information of an antenna terminal corresponding to a first delay offset value, the base station being configured to pre-store location information of each of the antenna terminals corresponding to different frequency offset values of the corresponding second signal; or obtaining first location information of an antenna terminal corresponding to each first delay offset value, obtaining a first signal strength of the corresponding second signal of each of the antenna terminals corresponding to each first delay offset value, and obtaining the location information of the terminal device by using the channel transmission model according to the at least one piece of first location information and at least one of first signal strengths.

6. The method of claim 5, wherein the first signal and the at least one second signal are received at the base station, and obtaining the location information of the terminal device comprises:

separately obtaining, according to the at least one second signal, a second delay offset value of the corresponding second signal of each of the antenna terminals relative to the first signal; and either obtaining the location information of the terminal device by using a channel transmission model according to at least one second delay offset value and at least one piece of second location information, the second location information being location information of an antenna terminal corresponding to a second delay offset value, or obtaining second location information of an antenna terminal corresponding to each second delay offset value, obtaining a second signal strength of the corresponding second signal of each of the antenna terminals corresponding to each second delay offset value, and obtaining the location information of the terminal device by using the channel transmission model according to the at least one piece of second location information and at least one of second signal strengths.

7. The method of claim 5, wherein only the at least one second signal is received at the base station, and obtaining the location information of the terminal device comprises:

obtaining, according to the at least one second signal, a first frequency offset value corresponding to the corresponding second signal; and either obtaining the location information of the terminal device by using a channel transmission model according to at least one first frequency offset value and at least one piece of third location information, the third location information being location information of an antenna terminal corresponding to a first frequency offset value, or obtaining third location information of an antenna terminal corresponding to each first frequency offset value, obtaining a third signal strength of the corresponding second signal of each of the antenna terminals corresponding to each first frequency offset value, and obtaining the location information of the terminal device by using the channel transmission model according to the at least one piece of third location information and at least one of third signal strengths.

8. The method of claim 5, wherein the first signal and the at least one second signal are received at the base station, and obtaining the location information of the terminal device comprises:

obtaining, according to the at least one second signal, a second frequency offset value of the corresponding second signal relative to the first signal; and either obtaining the location information of the terminal device by using a channel transmission model according to at least one second frequency offset value and at least one piece of fourth location information, the fourth location information being location information of an antenna terminal corresponding to a second frequency offset value, or obtaining fourth location information of an antenna terminal corresponding to each second frequency offset value, obtaining a fourth signal strength of the corresponding second signal of each of the antenna terminals corresponding to each second frequency offset value, and obtaining the location information of the terminal device by using the channel transmission model according to the at least one piece of fourth location information and at least one of fourth signal strengths.

9. A terminal device positioning system, comprising:
a base station; and
at least one antenna terminal coupled to the base station and configured to receive a first signal from a terminal device, the at least one antenna terminal comprising
a power amplifier; and
a filter, the power amplifier being configured to perform power compensation processing on the first signal according to a preset gain so as to obtain a power compensated signal before the filter obtains a second signal by frequency conversion processing of a clutter filtered signal obtained after clutter filtering, each antenna terminal being configured to send a corresponding second signal to the base station, and the base station is configured to:
obtain, according to the corresponding second signal, a first delay offset value for the corresponding second signal
either obtain location information of the terminal device by using a channel transmission model according to at least one first delay offset value and at least one piece of first location information, the first location information being location information of an antenna terminal for a corresponding first delay offset value; and
pre-store either location information of each of the antenna terminals for a corresponding delay offset value of one of the antenna terminals or location information of each of the antenna terminals for a corresponding frequency offset value of the one of the antenna terminals.

10. The system of claim 9, wherein each of the antenna terminals further comprises an antenna and a delay device, the delay device being configured to perform delay processing on the first signal according to a preconfigured delay offset value so as to generate the corresponding second signal.

11. The system of claim 10, wherein before the delay device performs the delay processing on the first signal so as to generate the corresponding second signal, the power amplifier is configured to perform the power compensation processing on the first signal according to the preset gain so as to obtain the first signal obtained after the power compensation processing.

12. The system of claim 9, wherein each of the antenna terminals further comprises:
an antenna; and
a frequency conversion device, the filter being configured to perform filtering processing on the first signal so as to obtain the first signal obtained after the clutter filtering, and the frequency conversion device being configured to perform, according to a preconfigured frequency offset value, frequency offset processing on the first signal obtained after the clutter filtering so as to generate the second signal.

13. The system of claim 12, wherein the base station is further configured to:
separately obtain, according to the corresponding second signal, a first frequency offset value of the corresponding second signal; and
either obtain the location information of the terminal device by using a channel transmission model according to at least one first frequency offset value and at least one piece of third location information, the third location information being location information of an antenna terminal corresponding to the first frequency offset value, or
obtain each of:
third location information of the antenna terminal corresponding to the first frequency offset value;
a third signal strength of the corresponding second signal of each of the antenna terminals corresponding to the first frequency offset value; and
obtain the location information of the terminal device by using the channel transmission model according to at least one piece of the third location information and at least one of the third signal strengths.

14. The system of claim 9, further comprising an antenna, and when each antenna terminal sends the corresponding second signal to the base station, the antenna is configured to:
receive the first signal from a user terminal; and
send the first signal to the base station when each of the antenna terminals sends the corresponding second signal to the base station.

15. The system of claim 14, wherein the base station is further configured to:
separately obtain, according to the corresponding second signal, a second delay offset value of the corresponding second signal relative to the first signal; and
either obtain the location information of the terminal device by using a channel transmission model according to the second delay offset value of the corresponding second signal and at least one piece of second location information, the second location information being location information of an antenna terminal for a corresponding second delay offset value, or
obtain second location information of the antenna terminal for the corresponding second delay offset value, obtain a second signal strength of the corresponding second signal of each of the antenna terminals for the corresponding second delay offset value, and obtain the location information of the terminal device by using a channel transmission model according to at least one piece of the second location information and at least one of the second signal strengths.

16. The system of claim 14, wherein the base station is further configured to:
separately obtain, according to the at least one second signal, a second frequency offset value of the corresponding second signal relative to the first signal; and
obtain the location information of the terminal device by using a channel transmission model according to at least one second frequency offset value and at least one piece of fourth location information, the fourth location information being location information of an antenna terminal corresponding to the second frequency offset value; or
obtain fourth location information of the antenna terminal corresponding to a second frequency offset value, obtain a fourth signal strength of the corresponding second signal of each of the antenna terminals corresponding to the second frequency offset value, and obtain the location information of the terminal device by using a channel transmission model according to at least one piece of the fourth location information and at least one of the fourth signal strengths.

17. The system of claim 9, wherein the base station is further configured to obtain first location information of an antenna terminal corresponding to each first delay offset value, obtain a first signal strength of the corresponding second signal of each of the antenna terminals corresponding to each first delay offset value, and obtain the location information of the terminal device by means of calculation using the channel transmission model according to at least one piece of the first location information and at least one of first signal strengths.

* * * * *

UNITED STATES PATENT AND TRADEMARK OFFICE
CERTIFICATE OF CORRECTION

PATENT NO. : 10,274,578 B2  
APPLICATION NO. : 15/463370  
DATED : April 30, 2019  
INVENTOR(S) : Yi Zhang Page 1 of 1

It is certified that error appears in the above-identified patent and that said Letters Patent is hereby corrected as shown below:

Page 2, Other Publications Column 2, Line 36, should read:  
Foreign Communication From A Counterpart Application, Korean Application No. 10-2017-7009590, Korean Office Action dated January 31, 2019, 4 pages.

Signed and Sealed this  
Ninth Day of July, 2019

Andrei Iancu  
*Director of the United States Patent and Trademark Office*